(12) United States Patent
Yamada

(10) Patent No.: US 7,229,349 B2
(45) Date of Patent: Jun. 12, 2007

(54) MULTI-PLAYER GAME SYSTEM AND MULTI-PLAYER GAME PROGRAM

(75) Inventor: Yoichi Yamada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 552 days.

(21) Appl. No.: 10/430,344

(22) Filed: May 7, 2003

(65) Prior Publication Data

US 2003/0211877 A1 Nov. 13, 2003

(30) Foreign Application Priority Data

May 9, 2002 (JP) ............................ 2002-134609

(51) Int. Cl.
*A63F 9/24* (2006.01)
*A63F 13/00* (2006.01)
*G06F 17/00* (2006.01)
*G06F 19/00* (2006.01)

(52) U.S. Cl. ..................... 463/9; 463/1; 463/9; 463/25; 463/29; 463/30; 463/31; 463/40; 463/41; 463/42; 709/220

(58) Field of Classification Search ................... 463/1, 463/25, 29–31, 40–42; 709/220
See application file for complete search history.

(56) References Cited

U.S. PATENT DOCUMENTS

| | | | |
|---|---|---|---|
| 4,824,106 A | | 4/1989 | Ueda et al. |
| 5,265,888 A | | 11/1993 | Yamamoto et al. |
| 5,428,528 A | * | 6/1995 | Takenouchi et al. .......... 463/42 |

(Continued)

FOREIGN PATENT DOCUMENTS

EP 1097739 5/2001

(Continued)

OTHER PUBLICATIONS

"Examiner's Affidavit", Electronic Arts, "Command and Conquer: Red Alert 2". Images retrieved on [Mar. 11, 2006]. Retrieved from the Internet: <URL:http//www.gamespot.com>.*

(Continued)

*Primary Examiner*—Scott Jones
*Assistant Examiner*—Ryan Hsu
(74) *Attorney, Agent, or Firm*—Nixon & Vanderhye P.C.

(57) ABSTRACT

A multi-player game system includes number-of-players detection means for detecting the number of players participating in the game; primary game field data storage means for storing primary game field data; secondary game field data storage means for storing at least two units of secondary game field data 150, such that each unit of secondary game field data is associated with a different number of participating players; secondary game field data selection means for selecting, in accordance with the number of participating players as detected by the number-of-players detection means, one of the at least two units of secondary game field data from the secondary game field data storage means; game field generation means for combining the primary game field data with the secondary game field data to generate a game field. A plurality of players are allowed to play a game on the generated game field. Thus, in a multi-player game, it is possible to vary data concerning the game field, e.g., geography and objects, depending on the number of participating players.

14 Claims, 23 Drawing Sheets

U.S. PATENT DOCUMENTS

| | | | | |
|---|---|---|---|---|
| 5,899,810 A * | 5/1999 | Smith | ........................... | 463/42 |
| 6,015,348 A * | 1/2000 | Lambright et al. | ........... | 463/42 |
| 6,315,669 B1 * | 11/2001 | Okada et al. | ................. | 463/44 |
| 6,500,070 B1 * | 12/2002 | Tomizawa et al. | ............ | 463/43 |
| 6,508,711 B1 * | 1/2003 | Ono | ........................... | 463/43 |
| 6,554,712 B1 * | 4/2003 | Takahashi | .................... | 463/43 |
| 6,579,177 B2 * | 6/2003 | Mraovic | ........................ | 463/9 |
| 7,094,147 B2 * | 8/2006 | Nakata et al. | ................. | 463/9 |
| 2003/0162592 A1 * | 8/2003 | Takahashi | .................... | 463/33 |

FOREIGN PATENT DOCUMENTS

| | | | |
|---|---|---|---|
| EP | 1145749 A2 * | 10/2001 | |
| JP | 01-293892 | 11/1989 | |
| JP | 6-238062 | 8/1994 | |
| JP | 2001-293254 | 10/2001 | |

OTHER PUBLICATIONS

"De Re Atari", 1982 Chris Crawford, Chapter 3; http://www.atariarchives.org/dere/chapt03.php.

Sprite data related to game "Final Fantasy I", FF1 http://sprites.fireball20x1.com/OS/Square/Sheets/FF1.png.

"Command & Conquer Red Alert 2" Instruction Manual; 63 pages.

* cited by examiner

F I G. 6
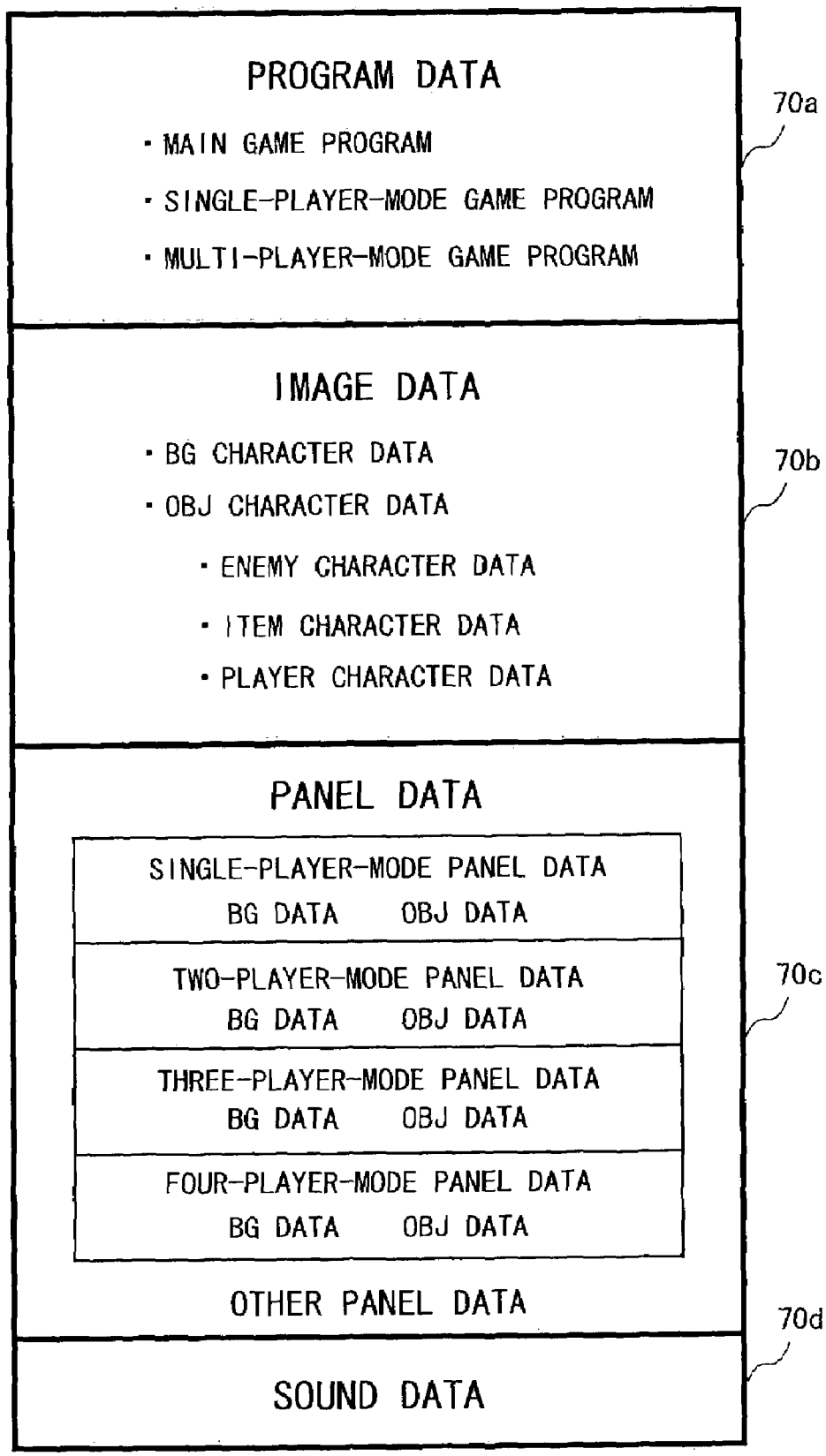

MULTI-PLAYER-MODE GAME PROCESSING

F I G. 21
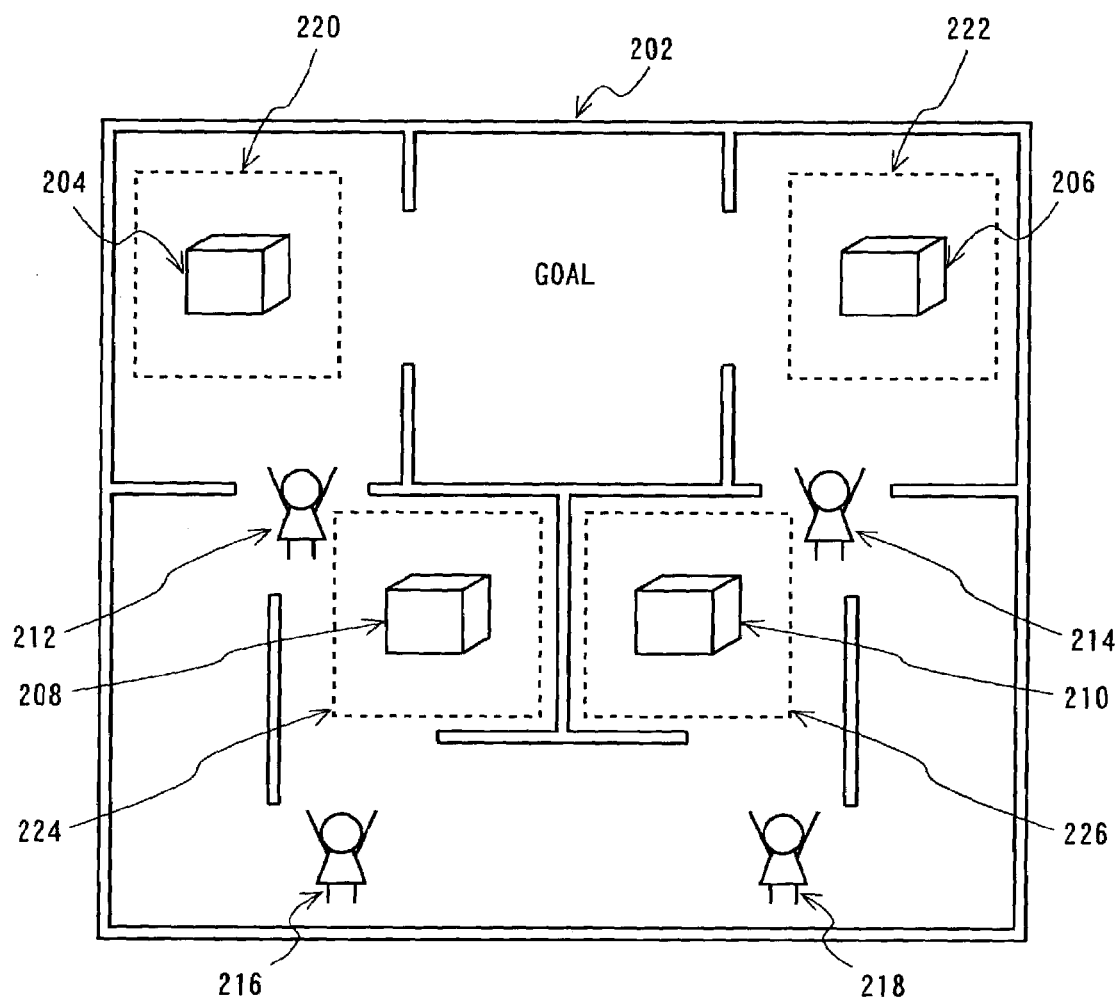

MULTI-PLAYER GAME SYSTEM AND MULTI-PLAYER GAME PROGRAM

BACKGROUND

1. Field

Present non-limiting exemplary embodiments relate to a multi-player game system and a multi-player game program. More particularly, the present non-limiting exemplary embodiments relate to a game system for allowing a plurality of players to play a video game, and a game program to be executed in such a system.

2. Description of Background Art

Japanese Patent Laid-Open Publication No. 6-238062 discloses a game device such that the size of a game space in which characters are allowed to move is changed in accordance with the number of players.

However, Japanese Patent Laid-Open Publication No. 6-238062 merely discloses a technique for adapting the size of a field of a fighting game according to the number of players who are participating in the game, and does not disclose a technique for adapting data concerning the geography of the game field and/or objects, etc.

SUMMARY

Therefore, a feature of a non-limiting exemplary embodiment is to provide a multi-player game system and a multi-player game program, which allow the game field to be changed in accordance with the number of participating players, thereby necessitating a change in the optimal tactics for playing the game.

A first aspect of a present non-limiting exemplary embodiment is directed to a multi-player game system for allowing a plurality of players to play a game, comprising: number-of-players detection means (CPU 50) for detecting the number of players participating in the game; primary game field data storage means (ROM 70) for storing primary game field data concerning a predetermined primary game field which does not vary depending on the number of participating players; secondary game field data storage means (ROM 70) for storing at least two units of secondary game field data concerning a secondary game field which varies depending on the number of participating players, wherein each unit of secondary game field data is associated with a different number of participating players; secondary game field data selection means (CPU 50) for selecting, in accordance with the number of participating players as detected by the number-of-players detection means, one of the at least two units of secondary game field data from the secondary game field data storage means; game field generation means (CPU 50) for combining the primary game field data which has been read from the primary game field data storage means with the secondary game field data which has been selected by the secondary game field data selection means to generate a game field; and game progression means (CPU 50) for allowing the plurality of players to play the game on the game field generated by the game field generation means.

Thus, according to the first aspect, the secondary game field varies depending on the number of participating players. As a result, the content of the game can be varied depending on the number of participating players, thus adding to the fun of the game, so that the player can experience a greater excitement.

In a second aspect based on the first aspect, each unit of secondary game field data contains geography data (52*a* to 52*e*) representing a geography of the game field, and the game field generation means generates the game field so as to have a different geography depending on the number of participating players.

Thus, according to the second aspect, the geography of the game field varies depending on the number of participating players, thereby allowing the player objects to move through various paths and open spaces.

In a third aspect based on the first aspect, each unit of secondary game field data contains obstacle data representing an obstacle on the game field, and the game field generation means generates the game field so as to include a different obstacle depending on the number of participating players.

Thus, according to the third aspect, different obstacles are generated depending on the number of participating players. As a result, it is possible to generate an appropriate obstacle according to the number of participating players.

In a fourth aspect based on the third aspect, the obstacle has a different size depending on the number of participating players.

Thus, according to the fourth aspect, the size of the obstacle varies depending the number of participating players. As a result, it is possible to change the size of the obstacle so as to be easy for the player objects to push. This prevents the obstacle from becoming too difficult to be pushed by an increased number of player objects.

In a fifth aspect based on the fourth aspect, the multi-player game system further comprises collision determination means (CPU 50) for detecting the number of player objects which are pushing the obstacle, wherein, if the collision determination means has determined that the player objects corresponding to a predetermined number of players are pushing the obstacle, the game field generation means generates the game field such that the obstacle appears to have moved.

Thus, according to the fifth aspect, the obstacle can be moved by a predetermined number of players pushing the obstacle. As a result, it is possible to change the number of player objects required to move the obstacle depending on the number of participating players, thereby introducing variations in the progress of the game.

In a sixth aspect based on the first aspect, the secondary game field data contains item data representing an item which affects the progress of the game, and the game field generation means generates the game field so as to include a different item depending on the number of participating players.

Thus, according to the sixth aspect, the item is changed depending on the number of participating players, thereby introducing variations in the progress of the game.

In a seventh aspect based on the sixth aspect, the generated game field includes a different number of items depending on the number of participating players.

Thus, according to the seventh aspect, the number of items is changed depending on the number of participating players. As a result, the player objects can be allowed to possess various items, thereby introducing variations in the progress of the game.

In an eighth aspect based on the first aspect, the generated game field includes a plurality of secondary game fields (192, 194, 196, 198), such that each of the plurality of secondary game fields is defined as a predetermined region on the generated game field from predetermined coordinates.

Thus, according to the eighth aspect, a plurality of secondary game fields are present at various positions on the game field, thus introducing variations in the game field in a patchwork-like fashion.

In a ninth aspect based on the first aspect, the multi-player game system comprises a plurality of game machines, wherein each player operates a corresponding one of the plurality of game machines, each game machine includes display means, the display means displaying a portion of the game field near the player object operated by each player.

Thus, according to the ninth aspect, the player objects manipulated by the respective players are displayed on separate display means, thereby making it easy for each player to recognize the player object which he or she is manipulating.

In a tenth aspect based on the first aspect, the secondary game field is a region of the primary game field, the game field generation means applies the secondary game field data which is selected by the secondary game field data selection means to a portion of the primary game field data which is read from the primary game field data storage means.

Thus, according to the tenth aspect, any region of the primary game field, which represents the entire game field, can be altered to be a secondary game field, thereby increasing the designing liberty of the game.

An eleventh aspect of the present invention is directed to a multi-player game program to be executed by a plurality of game machines on which a plurality of players are allowed to play a game, each of the plurality of game machines comprising: primary game field data storage means (ROM 70) for storing primary game field data concerning a predetermined primary game field which does not vary depending on the number of participating players; secondary game field data storage means (ROM 70) for storing at least two units of secondary game field data concerning a secondary game field which varies depending on the number of participating players, wherein each unit of secondary game field data is associated with a different number of participating players, wherein the multi-player game program comprises: a number-of-players detection program (step S404) for detecting the number of players participating in the game; a secondary game field data selection program (step S416) for selecting, in accordance with the number of participating players as detected by the number-of-players detection program, one of the at least two units of secondary game field data from the secondary game field data storage means; a game field generation program (step S420, S422) for combining the primary game field data which has been read from the primary game field data storage means with the secondary game field data which has been selected by the secondary game field data selection program to generate a game field; and a game progression program (step S424) for allowing the plurality of players to play the game on the game field generated by the game field generation program. Such a game program is typically stored on a computer-readable recording medium, and executed by a computer which reads the game program.

Thus, according to the eleventh aspect, effects similar to those obtained according to the first aspect can be realized.

In a twelfth aspect based on the eleventh aspect, each unit of secondary game field data contains geography data representing a geography of the game field, and the game field generation program generates the game field so as to have a different geography depending on the number of participating players.

Thus, according to the twelfth aspect, effects similar to those obtained according to the second aspect can be realized.

In a thirteenth aspect based on the eleventh aspect, each unit of secondary game field data contains obstacle data representing an obstacle (144, 164) on the game field, and the game field generation program generates the game field so as to include a different obstacle depending on the number of participating players.

Thus, according to the thirteenth aspect, effects similar to those obtained according to the third aspect can be realized.

In a fourteenth aspect based on the thirteenth aspect, the obstacle has a different size depending on the number of participating players.

Thus, according to the fourteenth aspect, effects similar to those obtained according to the fourth aspect can be realized.

In a fifteenth aspect based on the fourteenth aspect, the multi-player game program further comprises a collision determination program (step S704) for detecting the number of player objects which are pushing the obstacle, wherein, if the collision determination program has determined that the player objects corresponding to a predetermined number of players are pushing the obstacle, the game field generation program generates the game field such that the obstacle appears to have moved.

Thus, according to the fifteenth aspect, effects similar to those obtained according to the fifth aspect can be realized.

In a sixteenth aspect based on the eleventh aspect, the secondary game field data contains item data representing an item (184, 186, 204, 206, 208, and 210) which affects the progress of the game, and the game field generation program generates the game field so as to include a different item depending on the number of participating players.

Thus, according to the sixteenth aspect, effects similar to those obtained according to the sixth aspect can be realized.

In a seventeenth aspect based on the sixteenth aspect, the generated game field includes a different number of items depending on the number of participating players.

Thus, according to the seventeenth aspect, effects similar to those obtained according to the seventh aspect can be realized.

In an eighteenth aspect based on the eleventh aspect, the generated game field includes a plurality of secondary game fields (192, 194, 220, 222, 224, and 226), such that each of the plurality of secondary game fields is defined as a predetermined region on the generated game field from predetermined coordinates.

Thus, according to the eighteenth aspect, effects similar to those obtained according to the eighth aspect can be realized.

In a nineteenth aspect based on the eleventh aspect, the number-of-players detection program, the secondary game field data selection program, and the game field generation program are simultaneously executed on the plurality of game machines.

Thus, according to the nineteenth aspect, the programs are executed on each game machine operated by a player. Therefore, it is possible to interconnect a large number of game machines to play the game, thereby introducing a greater variety of playing.

In a twentieth aspect based on the eleventh aspect, the secondary game field is a region of the primary game field, the game field generation program applies the secondary game field data which is selected by the secondary game field data selection program to a portion of the primary game field data which is read from the primary game field data storage means.

Thus, according to the twentieth aspect, effects similar to those obtained according to the tenth aspect can be realized.

These and other objects, features, aspects and advantages of the present non-limiting exemplary embodiments will become more apparent from the following detailed description of the present non-limiting exemplary embodiments when taken in conjunction with the accompanying drawings.

BRIEF DESCRIPTION OF THE DRAWINGS

FIG. 6 is a diagram illustrating an exemplary memory map of a ROM 70 shown in FIG. 2;

FIG. 21 is a diagram illustrating a four-player-mode game field for the second dungeon;

DESCRIPTION OF NON-LIMITING EXEMPLARY EMBODIMENTS

The present embodiment illustrates a game system which allows a game field to be changed in accordance with the number of game devices which are connected to the system, thereby necessitating a change in the optimal tactics for playing the game.

The game system according to the present embodiment is realized by a distinctive processing which is performed by a CPU, memories, and like elements in cooperation. Prior to the description of the game system according to the present embodiment, the outline of game machines and the content of a game employed in conjunction with the present embodiment will be described.

First, an outline of the game machine used in the present embodiment will be described. The game machine used in the present embodiment is a hand-held type game machine (product name: Gameboy Advance (R)) marketed by the Applicant. The game machine incorporates a CPU, a V-RAM, a W-RAM, a liquid crystal display screen, and various buttons. The game machine is designed so that a game cartridge, including a ROM and a RAM, can be connected thereto in a detachable manner. When the CPU executes a game program stored in the ROM within the game cartridge, a game image is displayed on the liquid crystal display screen. The game progresses as a predetermined button(s) is pressed by the player. The game to be executed on the game machine used in the present embodiment is a two-dimensional game, where object images (OBJ) are overlaid on a background image (BG). BG is defined as a background image for the game; in the present embodiment, BG represents the geography of a dungeon (cave). OBJ is defined as a character object which is capable of moving on the game field; in the present embodiment, OBJ may represent a player object, an enemy object, an item object, or a movable wall object. Up to four such game machines can be electrically interconnected via communication cables, such that a plurality of player objects can participate in the game on the same game field through data exchanging.

Figure 1:
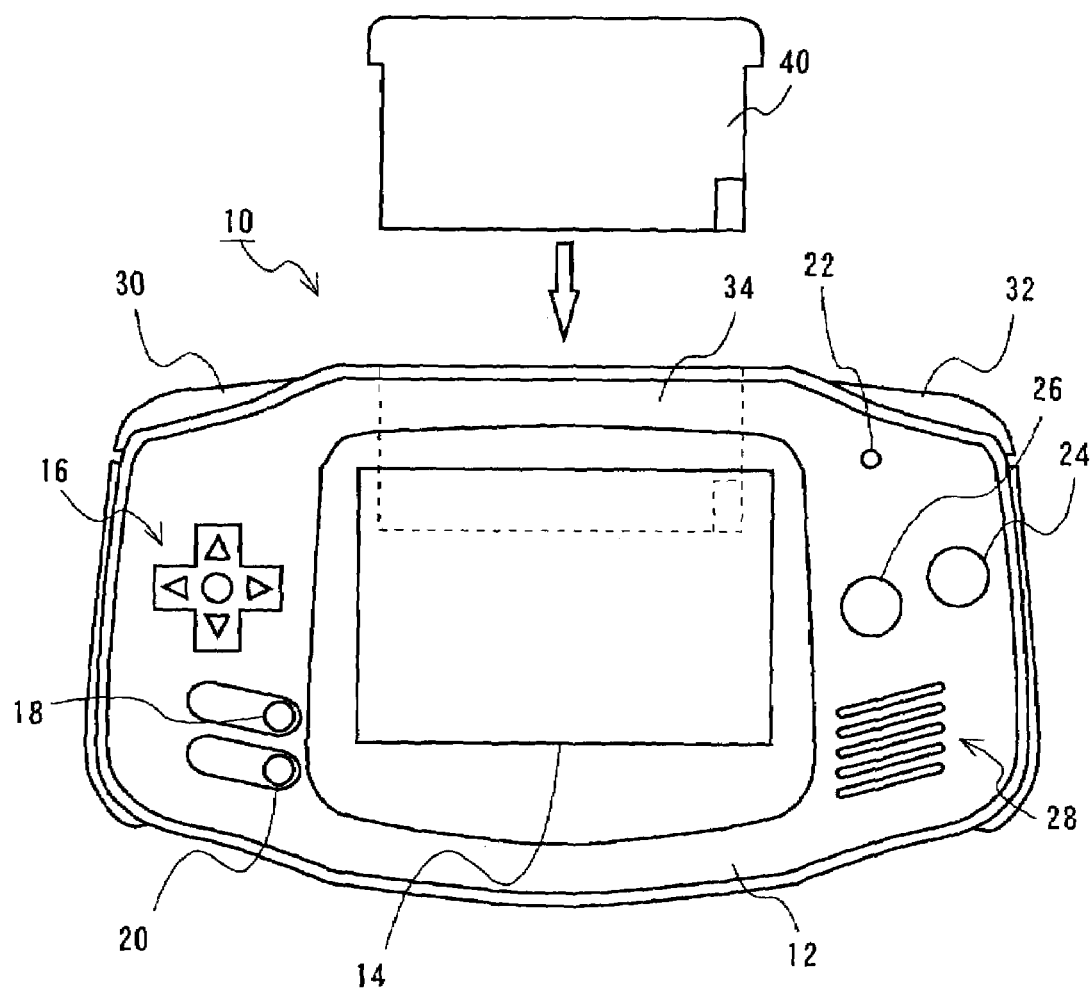
FIG. 1 is a plan view showing an exemplary outlook of a game machine according to a present embodiment.

Hereinafter, the game system provided by the present embodiment and a game program to be executed in the game system will be described with reference to FIGS. 1 to 21. Referring to FIG. 1, the game device used in the present embodiment is a hand-held type color liquid crystal game machine (hereinafter simply referred to as a "game machine") 10. The game machine 10 includes a housing (case) 12. In the substantial center of the case 12, a reflection-type color liquid crystal display device (hereinafter simply referred to as an "LCD") 14 is provided. On the left side of the LCD 14, a cross button 16 is provided. Below the cross button 16, a start button 18 and a selection button 20 are provided.

The LCD 14, which may be a dot matrix display device, is used for displaying game characters (object images) and a background image in color. The cross button 16 is used for instructing a movement of a game character on the LCD 14 in a upper-right, upper-left, lower-right, or lower-left direction. The start button 18 is used for issuing instructions such as start game, pause, or resume. The selection button 20 is used for selecting game modes or the like.

Near the upper right corner of the LCD 14, an LED (power lamp) 22 is provided. Below the LED 22, two press buttons (i.e., an A-button 24 and a B-button 26 in this embodiment) are provided, below which a loudspeaker 28 is provided.

The LED 22 indicates whether the main power of the game machine 10 is on or off by being lit or being not lit, and indicates the remaining battery power based on the color in which it is lit. The A-button 24 and B-button 26 are used for instructing movements (motions) of a game character. For example, the A-button 24 and B-button 26 may be activated for causing a game character to use a weapon, run, or jump, etc. The loudspeaker 28 is used to output background music and/or the voices and onomatopoeic sounds from the game characters during the game.

On the upper side face (roof face) of the case 12, a left press button (L-button) 30 and a right press button (R-button) 32 are provided. The L-button 30 and the R-button 32 are used for instructing motions of the game character, as are the A-button 24 and B-button 26.

Also on the roof face of the case 12, an insertion opening 34 is provided so as to be located between the L-button 30 and the R-button 32 and extend beneath the LCD 14. A memory cartridge 40 is inserted through the insertion opening 34 to be attached to the game machine 10.

Although not shown, an external expansion connector is provided on the roof face of the case 12; a battery box is provided on the back side of the case 12; and a power switch, a sound volume controller, an earphone jack, and the like are provided on the bottom face of the case 12.

Figure 2:
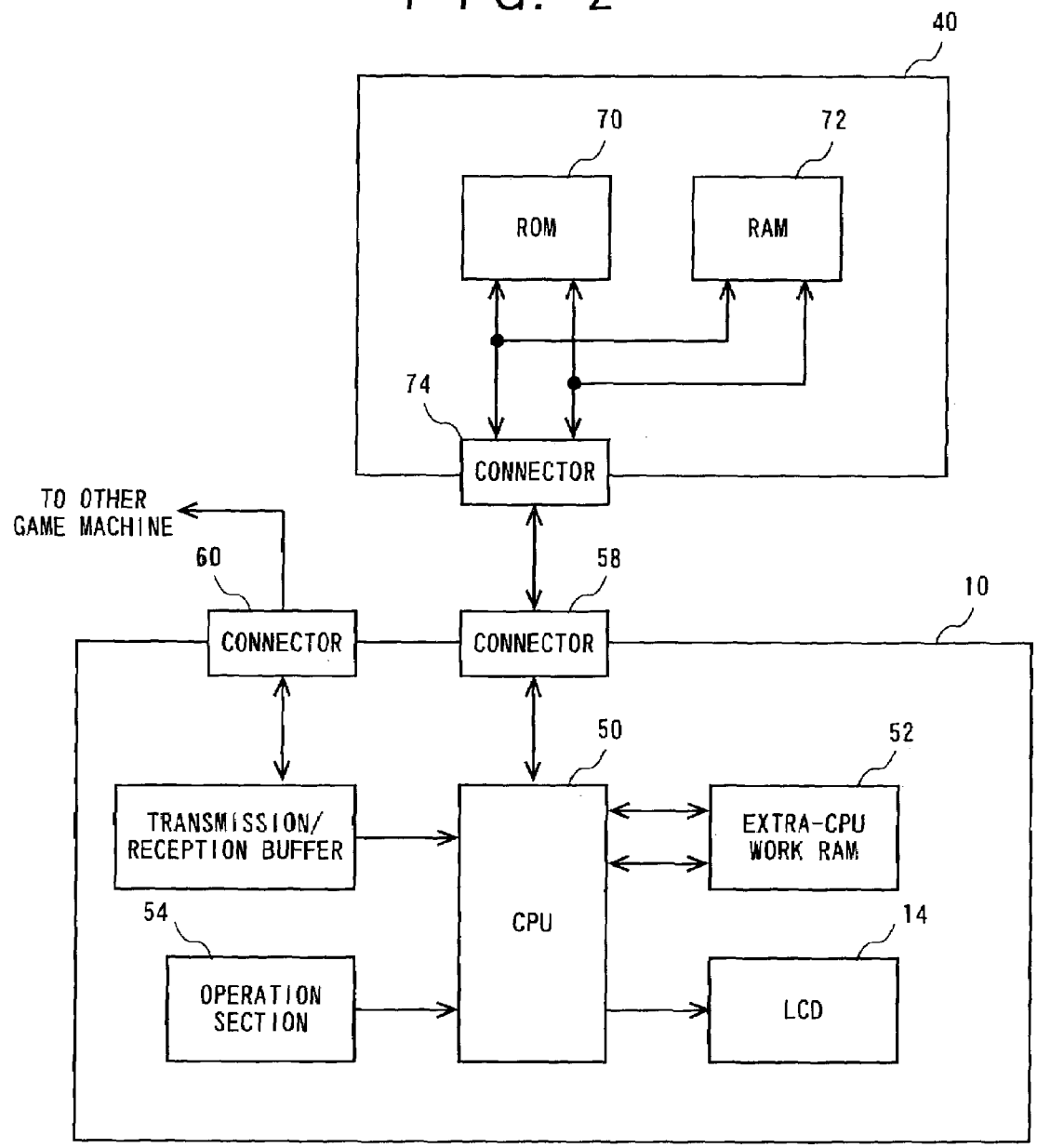
FIG. 2 is a block diagram illustrating an exemplary structure of a game system according to a present embodiment.

FIG. 2 shows a specific structure of the game machine 10 and the memory cartridge 40 described above. The game machine 10 includes a CPU 50. The CPU 50 is coupled to a work RAM 52 which is located outside the CPU (hereinafter referred to as the "extra-CPU work RAM 52") and an operation section 54 via an internal bus. The extra-CPU work RAM 52 is used as a work memory or buffer memory for the CPU 50. Although not specifically shown, the cross button 16, the start button 18, the selection button 20, the A-button 24, the B-button 26, the L-button 30, the R-button 32, and like elements shown in FIG. 1 are coupled to the operation section 54. When each of these buttons (16 to 20, 24, 26, 30, and 32) is operated, the operation section 54 generates an operation signal corresponding to the operated button(s), and inputs the generated operation signal to the CPU 50.

Also coupled to the CPU 50 via an internal bus are the LCD 14 and a connector 58. Note that the connector 58 is omitted from illustration in FIG. 1.

The memory cartridge 40 includes a ROM 70 and a RAM 72. The ROM 70 and the RAM 72 are interconnected via an internal bus, and coupled to a connector 74. Note that the connector 74 is omitted from illustration in FIG. 1.

As such, when the memory cartridge 40 is mounted to the game machine 10, the CPU 50 is coupled to the ROM 70 and RAM 72 in the memory cartridge 40. As described in more detail later, the ROM 70 stores programs necessary for the game (e.g., the game program itself), image data, audio data, and the like. The RAM 72, which may be an SRAM or a flash memory, for example, stores backup data for the game.

Figure 3:
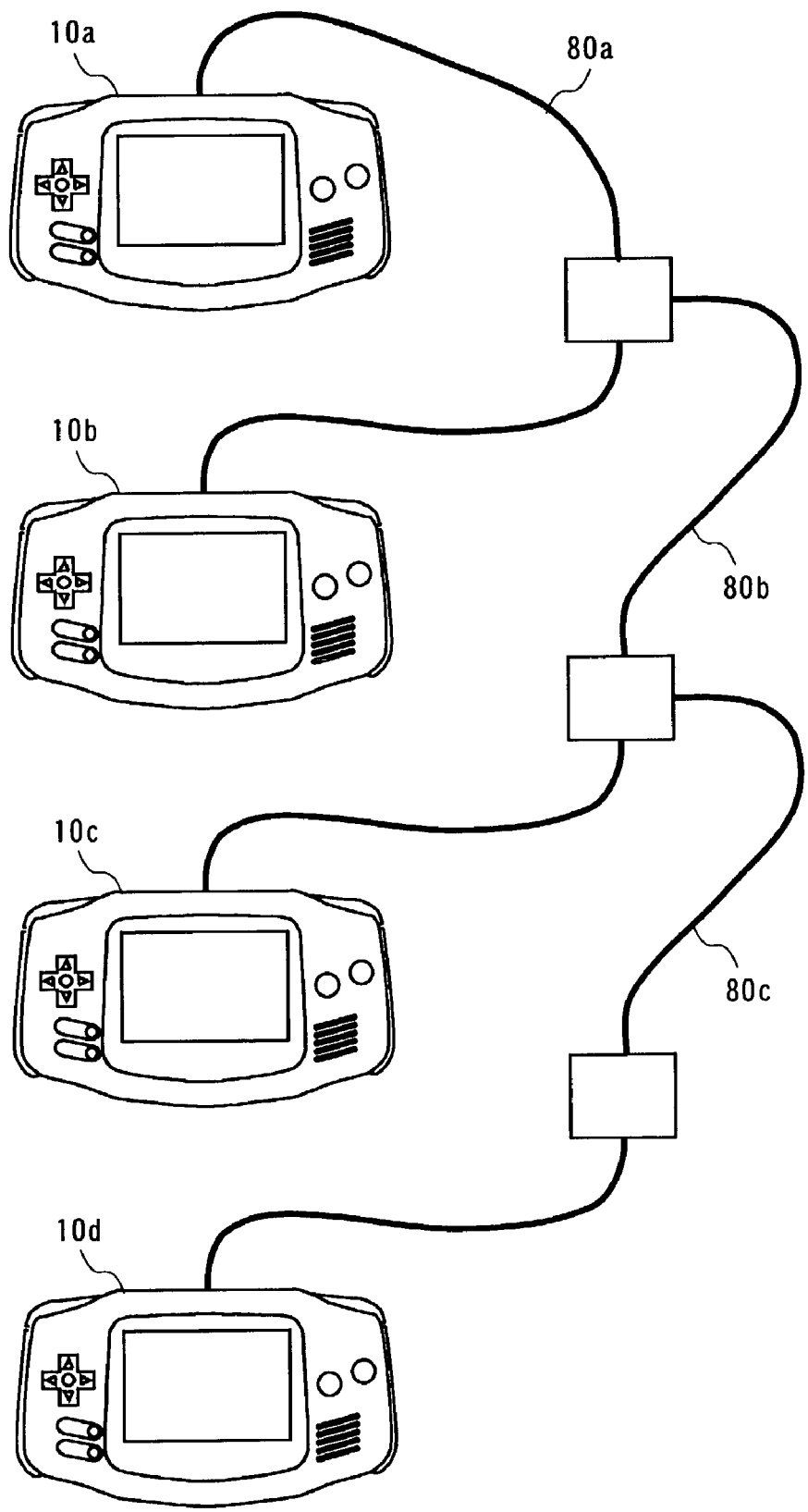
FIG. 3 is an illustration showing a manner in which four game machines according to the present embodiment are interconnected.

FIG. 3 is an illustration showing a manner in which four game machines 10 are interconnected via communication cables 80a, 80b, and 80c so that data can be exchanged therebetween. By thus connecting the game machines 10 via communication cables, data exchanging between the game machine can be realized, thereby making it possible to play a predetermined game at the respective game machines 10 based on common data.

Figure 4:
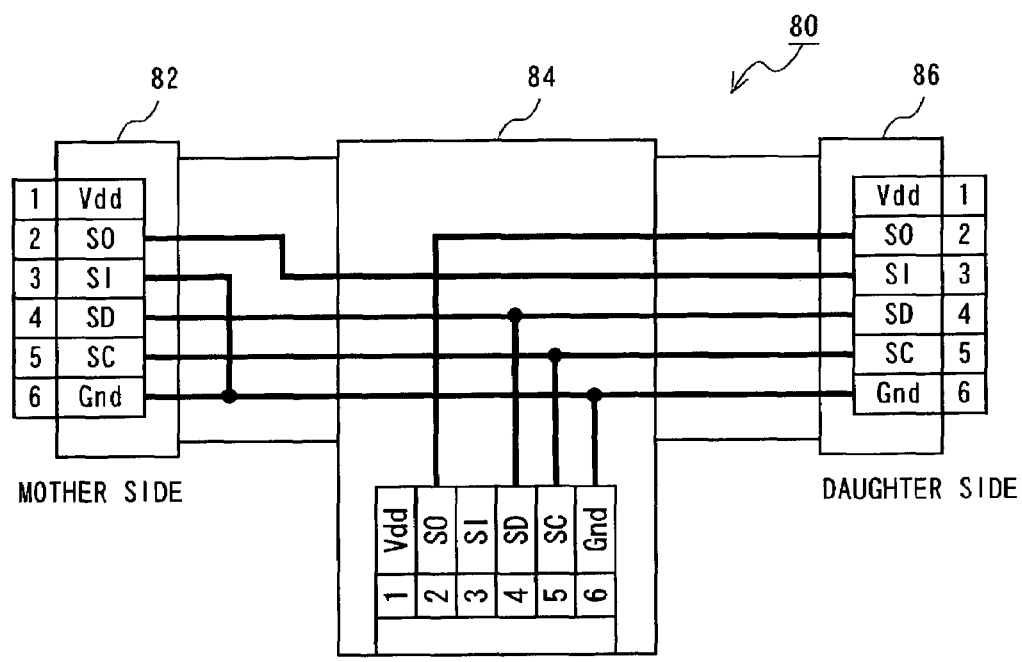
FIG. 4 is a block diagram illustrating a communication cable according to the present embodiment.

As shown in FIG. 4, each communication cable 80 is composed of a mother-side connector 82, a branching connector 84, and a daughter-side connector 86, which are coupled via a cable. The mother-side connector 82, the branching connector 84, and the daughter-side connector 86 have an identical structure, and each include a terminal Vdd for providing a source voltage, a terminal SO for outputting shift data, a terminal SI for inputting shift data, a terminal SD for inputting/outputting data, a terminal SC for inputting/outputting a shift clock, and a terminal Gnd for setting a ground voltage. The terminal SO of the mother-side connector 82 is coupled to the terminal SI of the daughter-side connector 86 via the cable. The terminal SI of the mother-side connector 82 is coupled to the terminal Gnd of the mother-side connector 82, the terminal Gnd of the daughter-side connector 86, and the terminal Gnd of the branching connector 84. Thus, the terminal SI of the mother-side connector 82 is set at zero voltage, as are the Gnd terminals. The terminal SD of the mother-side connector 82 is coupled to the terminal SD of the daughter-side connector 86 and the terminal SD of the branching connector 84, so that the same data can be commonly inputted/outputted via these terminals. The terminal SC of the mother-side connector 82 is coupled to the terminal SC of the daughter-side connector 86 and the terminal SC of the branching connector 84, so that the same clock signal can be commonly inputted/outputted via these terminals. As mentioned above, the terminal Gnd of the mother-side connector 82 is coupled to the terminal SI of the mother-side connector 82, the terminal Gnd of the daughter-side connector 86, and the terminal Gnd of the branching connector 84.

Figure 5:
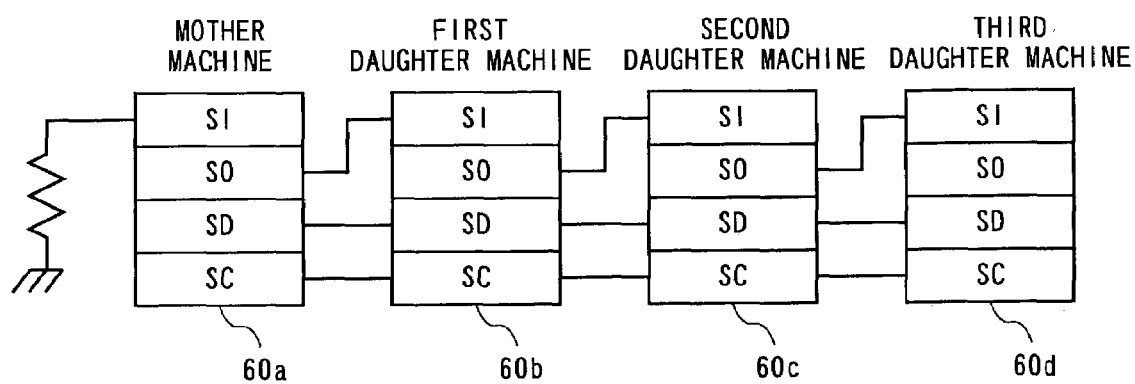
FIG. 5 is a diagram illustrating interconnections between terminals when four game machines according to the present embodiment are interconnected.

FIG. 5 is a diagram illustrating interconnections between the terminals of the communication cables 80 when four game machines 10 are interconnected as shown in FIG. 3. The specific operation under this situation will be described later.

Referring to FIG. 6, program data 70a, image data 70b, panel data 70c, and sound data 70d are previously stored in the ROM 70.

The program data 70a includes, for example, a main game program, a single-player-mode game program, and a multi-player-mode game program.

The image data 70b is data composing character data which is necessary for a primary game field and a secondary game field. Specifically, the image data 70b includes BG character data, i.e., character data for background images, and OBJ character data, such as enemy character data, item character data, and player object character data. As used herein, a "primary game field" is the entire game space through which the player objects are allowed to move, as defined in the initial settings. A "secondary game field" is a part of the entire game space.

The panel data 70c is data composing a secondary game field. Specifically, the panel data 70c includes: single-player-mode panel data, which is to be used in a game played by a single player; two-player-mode panel data, which is to be used in a game played by two players; three-player-mode panel data, which is to be used in a game played by three players; four-player-mode panel data, which is to be used in a game played by four players; and "other" panel data, which is set irrespective of the number of participating players. Thus, a "panel" refers to a secondary game field. Note that, when no panel is set, all of the game space is a "primary game field". On the other hand, if any panel is set, the partial game space(s) corresponding to that panel(s) becomes a "secondary game field(s)". More specifically, the panel data 70c includes: geography data (BG data) concerning the partial game space(s) corresponding to a panel(s); and enemy object data and item object data (OBJ data) concerning enemies and items which are present on that panel(s). As used herein, "BG data" is data representing fixed portions, e.g., geography and walls. "OBJ data" is data representing movable and/or changeable objects, e.g., enemies or items.

The sound data 70d includes sound effects data and/or BGM (background music) data, etc.

Figure 7:
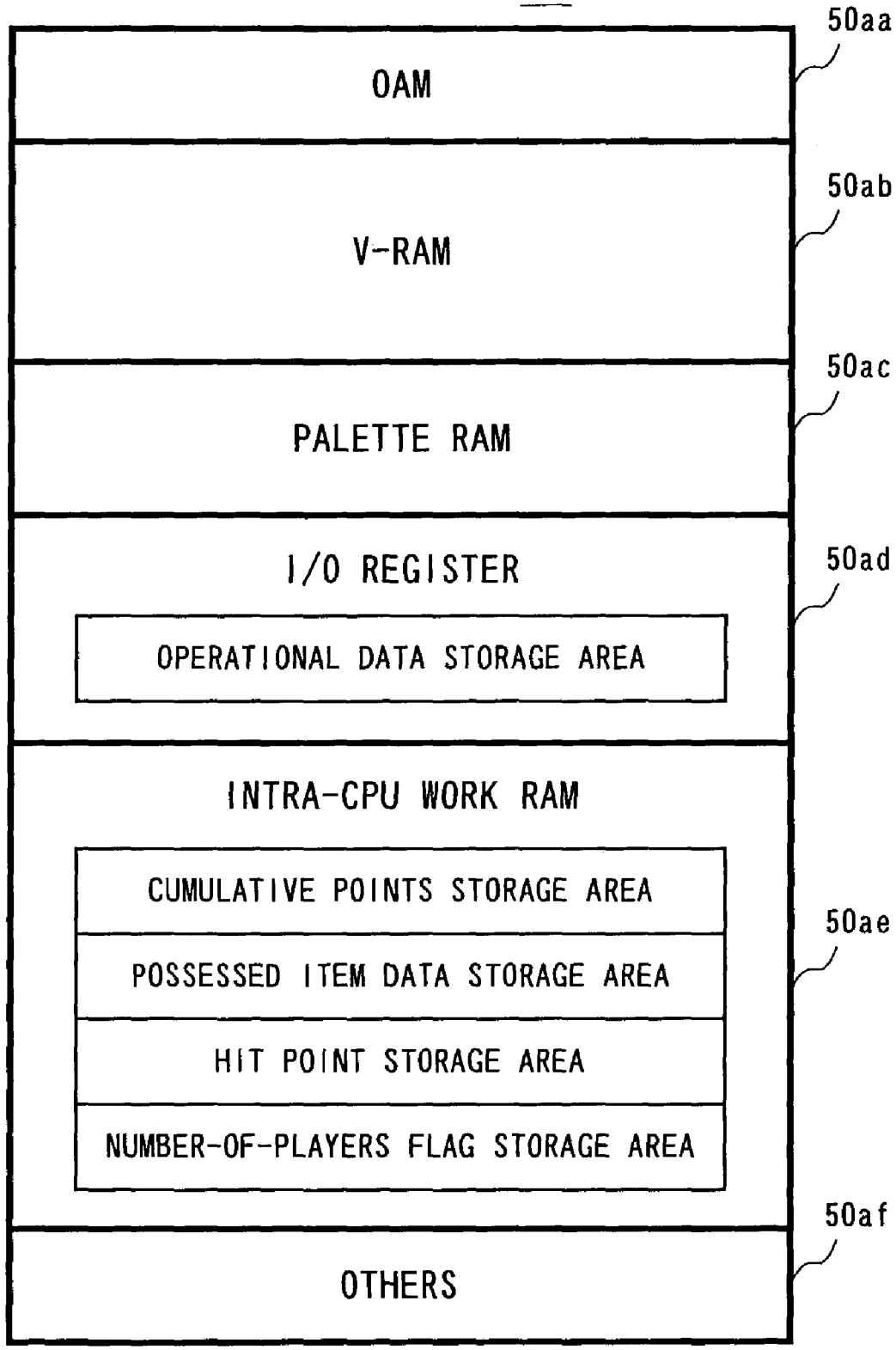
FIG. 7 is a diagram illustrating an exemplary memory map of an internal memory 50a of a CPU 50 shown in FIG. 2.

FIG. 7 is a diagram illustrating an exemplary memory map of an internal memory 50a of the CPU 50 shown in FIG. 2. As shown, the internal memory 50a includes an OAM 50aa, a V-RAM 50ab, a palette RAM 50ac, an I/O register 50ad, a work RAM 50ae which is located within the CPU 50 (hereinafter referred to as the "intra-CPU work RAM 50ae"), and an "others" area 50af. Specifically, the OAM 50aa is an area for storing OBJ data (i.e., data representing which OBJ character data is to be used, and at which position in the game field the OBJ character data is to be displayed) to be displayed. An OBJ character registered in this area will be displayed on the display screen.

Figure 8:
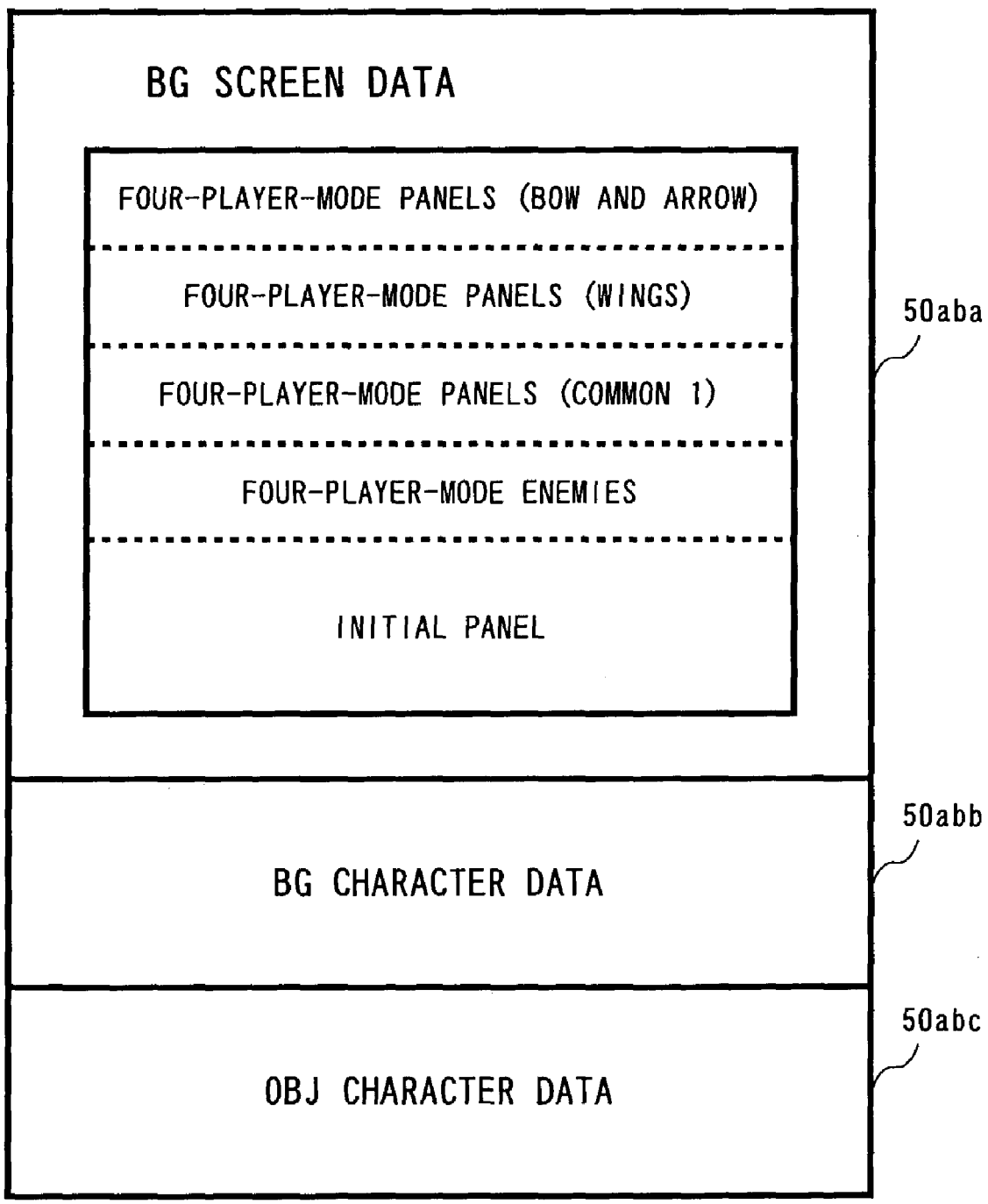
FIG. 8 is a diagram illustrating an exemplary memory map of an extra-CPU work RAM 52 shown in FIG. 2.

Referring to FIG. 8, the V-RAM 50ab includes: a BG screen data area 50aba; a BG character data area 50abb for storing BD character data, i.e., dot data of background images; and an OBJ character data area 50abc for storing OBJ character data, i.e., dot data of movable characters (OBJ). The BG screen data area 50aba stores BG screen data which defines a predetermined pattern, such that a background image can be constructed by arranging BG character data in accordance with the predetermined pattern defined by the BG screen data. Character data (BG or OBJ) is represented as a plurality of units of bitmap data of 8×8 dots. Any BG image or OBJ image to be displayed in the game can be represented by a combination of such bitmap data. The BG screen data stored in the BG screen data area 50aba varies depending on the panel data. For example, when a four-player-mode game is under execution, as shown in FIG. 8, the following screen data for displaying a background image according to the panel may be stored into the BG screen data area 50aba: four-player-mode panels (bow and arrow), four-player-mode panels (wings), four-player-mode panels (common 1), four-player-mode enemies, and an initial panel. As used above, "bow and arrow" and "wings" are names of items which can be used during the game. Herein, a panel which is to be used when the player object possesses the "bow and arrow" item is denoted as a "panel (bow and arrow)"; a panel which is to be used when the player object possesses the "wings" item is denoted as a "panel (wings)"; and a panel which is to be used irrespective of the item possessed by the player object is denoted as a "panel (common)". While FIG. 8 illustrates an exemplary case where a four-player-mode game is under execution, it will be appreciated that screen data based on panels corresponding to a single-player-mode game or a three-player-mode game may instead be stored in the BG screen data area 50aba.

Referring back to FIG. 7, the palette RAM 50ac will be described. The palette RAM 50ac is an area for storing color data corresponding to a predetermined number of colors (e.g., 256 colors) among the total number of colors which can be expressed on the game machine 10 (e.g., 32, 768 colors). The palette of colors defines a set of colors which can be simultaneously expressed on the display screen, and the color of any character to be displayed is determined by designating one of the colors stored in the palette RAM 50ac. The I/O register 50ad is composed of operational data concerning the operations of various switches (i.e., the A-button 24, the B-button 26, the cross button 16, the start button 18, the selection button 20, the L-button 30, and the R-button 32) and various registers or the like. The intra-CPU work RAM 50ae is an area for temporarily storing data which requires quick processing, e.g., data used during the execution of the game. For example, the intra-CPU work RAM 50ae may include: a cumulative points storage area for storing a cumulative sum of game points for each player; a possessed item data storage area for storing data representing items possessed by the player object corresponding to each player; a hit point storage area for storing hit points representing the damage sustained by the player object corresponding to each player; and a number-of-players flag storage area for storing a number-of-players flag representing the number of game machines which are connected to the system. The "others" area 50af is an area for storing other data.

Figure 9:
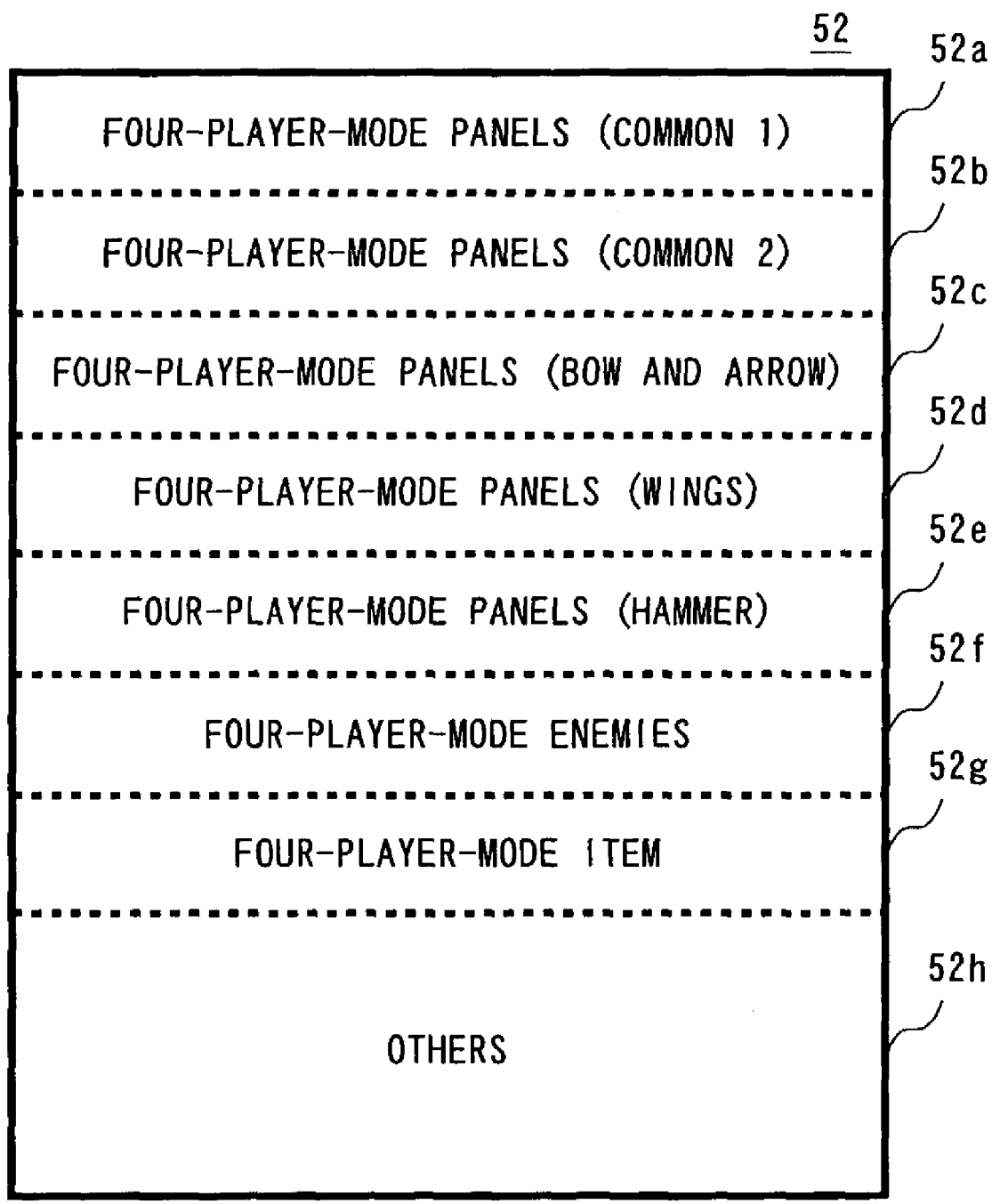
FIG. 9 is a diagram illustrating an exemplary memory map of an extra-CPU work RAM 52 shown in FIG. 2.

FIG. 9 is a diagram illustrating an exemplary memory map of the extra-CPU work RAM 52. The extra-CPU work RAM 52 is an area for temporarily storing data which is necessary for a predetermined unit in the game (e.g., one game field), such that the data does not require as quick a processing as that required for the data to be stored in the intra-CPU work RAM 50ae. The memory map shown in FIG. 9 illustrates a memory map for a four-player-mode game, i.e., a game to be played by four players. The extra-CPU work RAM 52 stores the four-player-mode panel (common 1) data 52a, four-player-mode panel (common 2) data 52b, four-player-mode panel (bow and arrow) data 52c, four-player-mode panel (wings) data 52d, four-player-mode panel (hammer) data 52e, four-player-mode enemy data 52f, four-player-mode item data 52g, and other data 52h which have been transferred from the ROM 70. As used herein, "four-player-mode panels (hammer)" are panels to be used when the player object does not possess a hammer item. For example, the four-player-mode panel (hammer) data may contain data representing enemies which can be conquered with a hammer and/or walls which can be destroyed with a hammer. As used herein, "four-player-mode enemies" are enemies which are not specified for a particular panel, e.g., enemies which may appear in a game field not corresponding to a panel. "Four-player-mode items" are items which are not specified for a particular panel, e.g., items which are present in a game field not corresponding to a panel.

Next, the manner in which communications are performed within the game system according to the present embodiment will be described. Referring to FIG. 3, the overall structure of an on-line game system according to one embodiment of the present invention will be described. The illustrated on-line game system includes four game machines 10a, 10b, 10c, and 10d and communication cables 80a, 80b, and 80c. The game machines 10a to 10d are interconnected via the communication cables 80a to 80c. Each of the game machines 10a to 10d has the same construction as that of the game machine 10 shown in FIG. 2. Since the four game machines 10a to 10d thus have the same construction, they may collectively be referred to as "game machines 10" in the following description unless it is necessary to distinguish between these game machines or between the constituent elements thereof. For conciseness, the game machines 10a to 10d may be denoted as the "first", "second", "third", and "fourth" game machines, respectively. Since the first game machine 10a takes the initiative in commencing communications in the present embodiment, the first game machine 10a may be referred to as the "mother machine", whereas the second to fourth game machines 10b to 10d may be referred to as the "daughter machines".

Figure 10:
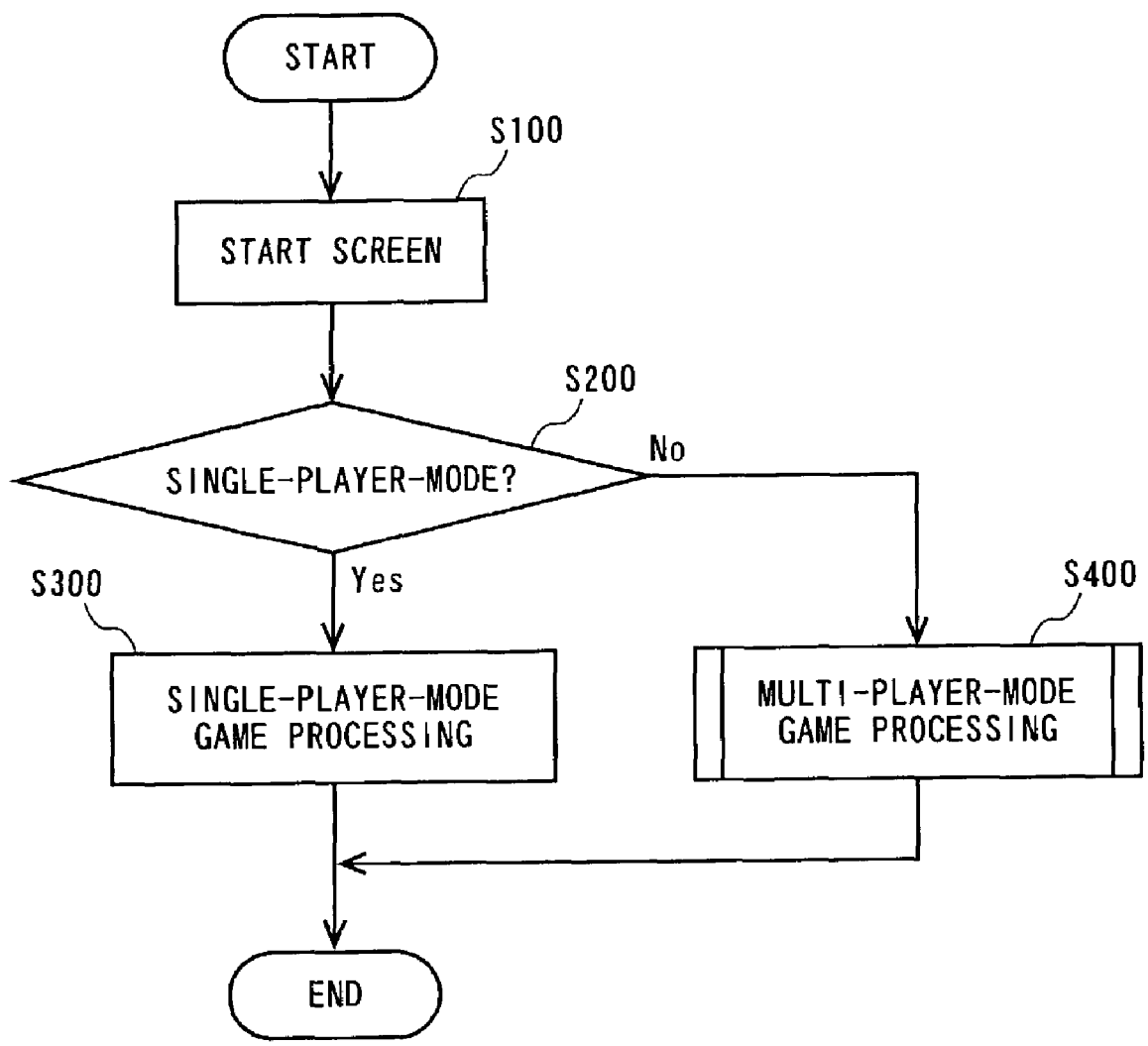
FIG. 10 is an overall flowchart illustrating a game according to one embodiment of the present embodiment.

Referring to the flowcharts of FIGS. 10 to 13, the operation of the game machines 10 used in the present embodiment will be described. FIG. 10 is an overall flowchart illustrating a game program performed by the game machines 10 used in the present embodiment. The game program as described by the flowchart of FIG. 10 is executed by each of the game machines 10a to 10d used in the present embodiment.

At step S100, the CPU 50 of the game machine 10 executes the main game program stored in the ROM 70, transfers the image data 70b stored in the ROM 70 to the V-RAM 50ab, generates predetermined image data, and outputs an image signal to the LCD 14, whereby a start screen is displayed on the LCD 14. As used herein, the "start screen" is a screen on which the player is allowed to choose either to play a single-player-mode game or play a multi-player-mode game. The player can determine the type of game to play by operating the cross button 16, the A-button 24, the B-button 26, and the like.

At step S200, the CPU 50 detects data in the I/O register 50ad, which stores the data from the operation section 54, to determine whether the player has selected a single-player-mode game or not. If the player has selected a single-player-mode game, the control proceeds to step S300. On the other hand, if the player has not selected a single-player-mode game, the control proceeds to step S400.

At step S300, the CPU 50 executes a single-player-mode game in accordance with a single-player-mode game program. At step S400, the CPU 50 executes a multi-player-mode game in accordance with a multi-player-mode game program.

Next, the multi-player-mode game processing at step S400 will be described in detail. First, the outline of the multi-player-mode game according to the present embodiment will be described. In the game according to the present embodiment, a plurality of players proceed through a dungeon (cave) toward a goal, while attaining objectives (e.g., solving conundrums). The game machines 10 are interconnected via the communication cable 80a (in the case where two players are participating), via the communication cables 80a and 80b (in the case where three players are participating), or via the communication cable 80a to 80c (in the case where four players are participating). In each case, the same game program is executed on the respective game machines 10 in the following manner. A player object (i.e., the main character or the character which is playable by the player) in the game being executed on each game machine 10 appears in the substantial center of the LCD 14. As the player operates the player object to move, the background image (BG) makes corresponding opposite movements in the up, down, right, and/or left direction, thereby causing the player object to appear as making relative movements against the background image (BG). The player objects which are being operated on the other game machines 10 are supposed to be "present" at certain positions on the map, and will show up on the LCD 10 when they come into the displayed area.

Figure 11:
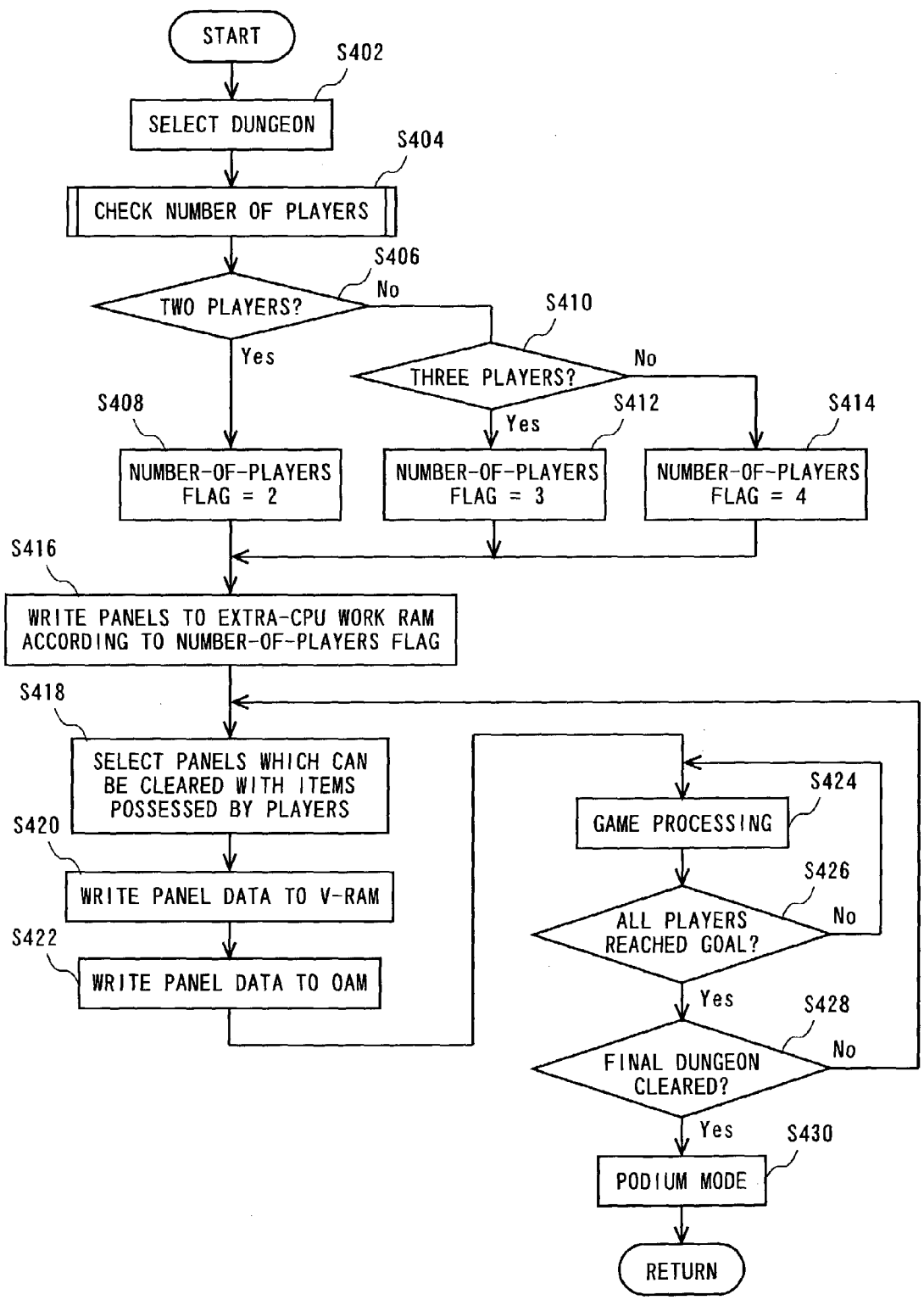
FIG. 11 is a flowchart illustrating the detailed procedure of step S400 in FIG. 10.

Referring to FIG. 11, the multi-player-mode game processing at step S400 of FIG. 10 will be described. At step S402, the player selects a dungeon in which to play the game, and the CPU 50 executes the game program corresponding to the selected dungeon.

At step S404, the CPU 50 detects the number of game machines 10 connected (i.e., the number of participating players). The specific detection method will be described later.

At step S406, the CPU 50 determines whether the number of participating players is two or not. If the number of participating players is two, the control proceeds to step S408. If the number of participating players is not two, the control proceeds to step S410. Although not shown in the flowchart, if the number of participating players is determined to be one, the CPU 50 displays an error message to prompt the player to ensure that another game machine(s) is connected, and the control returns to step S404. At step S408, the CPU 50 sets the number-of-players flag, which is stored in the intra-CPU work RAM 50ae, to be "2", and the control proceeds to step S416.

At step S410, the CPU 50 determines whether the number of participating players is three or not. If the number of participating players is three, the control proceeds to step S412. If the number of participating players is not three, the control proceeds to step S414. At step S412, the CPU 50 sets the number-of-players flag, which is stored in the intra-CPU work RAM 50ae, to be "3", and the control proceeds to step S416.

At step S414, the CPU 50 sets the number-of-players flag, which is stored in the intra-CPU work RAM 50ae, to be "4", and the control proceeds to step S416. The reason why any number exceeding three is regarded as "4" is that the maximum number of connectable game machines is predetermined to be four in the present embodiment. It will be appreciated that the maximum number of connectable game machines can be arbitrarily set.

At step S416, the CPU 50 transfers a portion of the panel data stored in the ROM 70 that corresponds to the value of the number-of-players flag (i.e., the number of participating players) to the extra-CPU work RAM 52. If the number-of-players flag is four, the four-player-mode panel (common 1) data 52a, the four-player-mode panel (common 2) data 52b, the four-player-mode panel (bow and arrow) data 52c, the four-player-mode panel (wings) data 52d, the four-player-mode panel (hammer) data 52e, the four-player-mode enemy data 52f, the four-player-mode item data 52g, and the "others" data 52h are transferred to the extra-CPU work RAM 52, as shown in FIG. 9.

At step S418, the CPU 50 detects item data concerning any items possessed by each player object as stored in the intra-CPU work RAM 50ae, and selects panels which can be cleared by using such items. For example, if a player object possesses the "bow and arrow" and "wings" items, the CPU 50 selects the four-player-mode panels (bow and arrow) and the four-player-mode panels (wings).

At step S420, out of the panel data stored in the extra-CPU work RAM 52, the CPU 50 transfers BG screen data to the V-RAM 50ab. The CPU 50 transfers the BG character data necessary for the dungeon to be executed (stored in the ROM 70 as image data 70b) to the BG character data area 50abb, and transfers the OBJ character data (also stored in the ROM 70 as image data 70b) to the OBJ character data area 50abc. For example, as shown in FIG. 8, the CPU 50 may store the following BG screen data for displaying a background image according to the panel into the BG screen data area 50aba: four-player-mode panels (bow and arrow), four-player-mode panels (wings), four-player-mode panels (common 1), four-player-mode enemies, and an initial panel. The four-player-mode panels (common 1) are panels which are to be used irrespective of the item possessed by the player object. The initial panel is a panel which selected irrespective of the number of participating players.

In accordance with a predetermined program, the CPU 50 generates BG data other than the BG (background) designated by the aforementioned panel data, and writes the generated BG data to the BG screen data area 50aba. As a result, BG data which combines a primary game field and secondary game fields (defined above) is generated.

At step S422, in accordance with the selected panel, the CPU 50 determines type data and position data for enemy objects, type data and position data for item objects, and type data and position data for other objects, and writes these data to the OAM 50aa.

Moreover, in accordance with a predetermined program, the CPU 50 writes type data and position data for player objects or any other object which is independent of the panel to the OAM 50aa. As a result, OBJ data which combines that for the primary game field and that for the secondary game fields is generated.

At step S424, the CPU 50 executes a predetermined program stored in the ROM 70a, which enables each player to play an RPG (role playing game) in which each player object moves through a dungeon, for example.

At step S426, the CPU 50 determines whether all of the player objects that are in the dungeon have reached the goal. If they have reached the goal, the control proceeds to step S428. If not all of them have reached the goal, the control returns to step S424 to continue on the game processing.

At step S428, the CPU 50 determines whether the last dungeon has been cleared or not. If the last dungeon has been cleared, the control proceeds to step S430. If the last dungeon has not been cleared, the control returns to step S418, where the initial settings for the next dungeon are made, after which the game is executed with respect to the next dungeon. When each dungeon has been cleared, the CPU 50 stores a cumulative sum of points into the cumulative points storage area of the intra-CPU work RAM 50ae with respect to each player. The cumulative sum of points is calculated as a sum of the clear points for the dungeon(s) which have previously been cleared plus the clear points for the currently-cleared dungeon. The clear points are determined in view of the order in which the players reached the goal of each dungeon, the amount time spent before the goal was reached, and the like.

At step S430, the CPU 50 executes a podium mode, in which a display process and a sound process for celebrating victorious players on a podium are performed, and thus the processing of the program according to the present embodiment is finished. Specifically, in the podium mode, the CPU 50 determines an order of excellence among the players who participated in the game, and processes for displaying a scene of celebrating the champion on the LCD 14 and/or reproducing appropriate BGM through the loudspeaker are performed. The order of excellence may be determined so that the player who has gained the most clear points is designated as the first, followed by the second, third, and fourth players in their descending order of cumulative sums of points.

Figure 12:
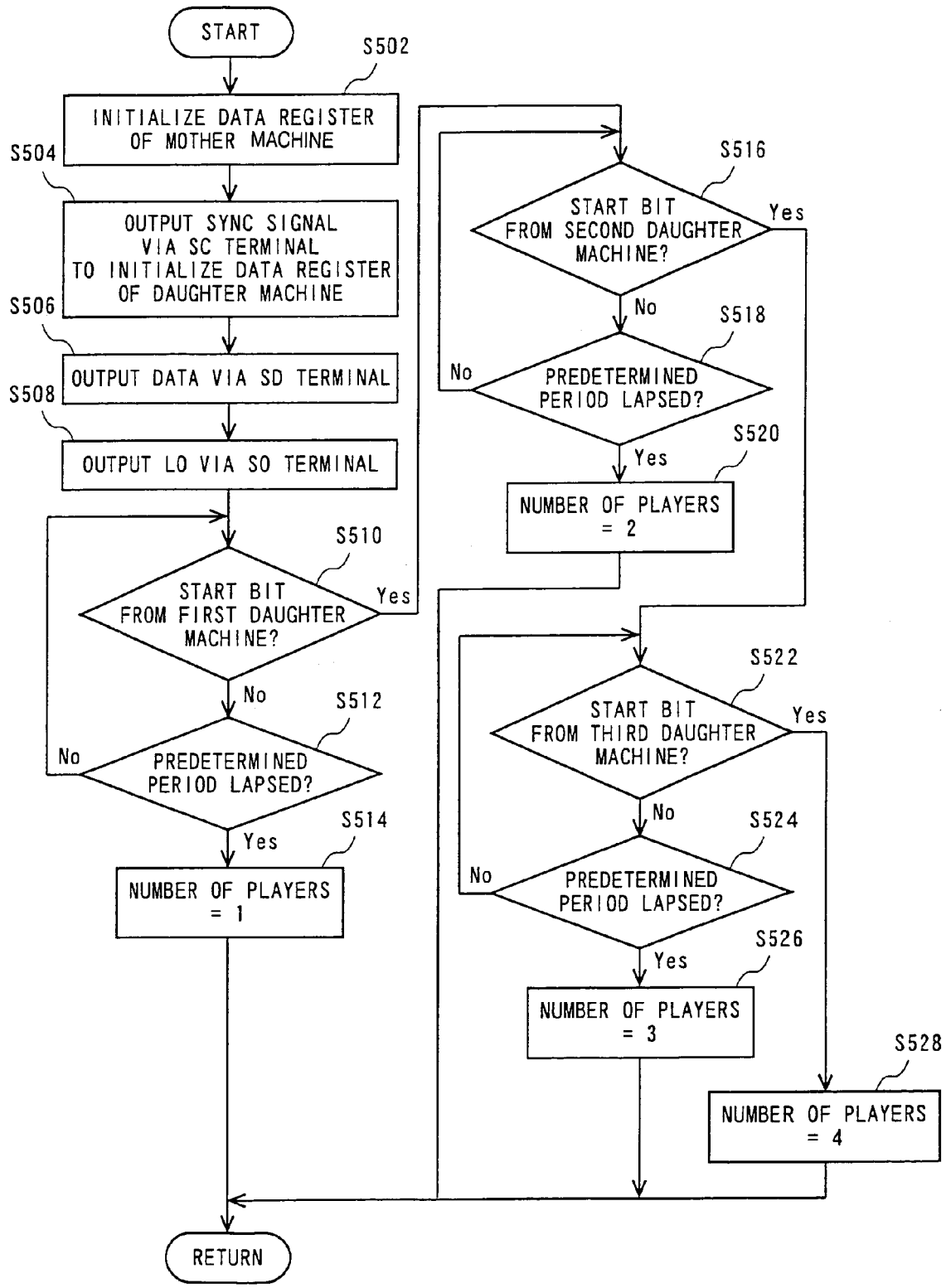
FIG. 12 is a flowchart illustrating the detailed procedure of step S404 in FIG. 11 on the mother-side.

Next, the process at step S404 of checking the number of participating players will be described with reference to the flowcharts of FIGS. 12 and 13. FIG. 12 is a flowchart illustrating the operation of a mother machine, i.e., the game machine 10a. A given game machine 10 can be determined to be a mother machine or not by the CPU 50, which determines whether the connector of a cable that is connected to the connector 60 of the game machine 10 is a mother-side connector 82 or not. If the connector of the cable connected to the connector 60 of the game machine 10 is a mother-side connector 82, the game machine 10 is determined as a mother machine. If the connector of a cable connected to the connector 60 of the game machine 10 is a daughter-side connector 86, the game machine is determined as a daughter machine. The CPU 50 distinguishes a mother-side connector 82 from a daughter-side connector 86 based on whether the terminal SI is always at the ground potential or not. As illustrated in FIG. 4, if the terminal SI of a connector is always at the ground potential, the connector is determined as a mother-side connector 82.

At step S502, the CPU 50 initializes a data register of the mother machine. The data register, which is part of the I/O register 50ad, stores the operational data from all of the game machines 10a to 10d (i.e., one mother machine and three daughter machines).

At step S504, the CPU 50 outputs a SYNC signal via the terminal SC of the connector 60 (see FIG. 5). As described later, a data register of each daughter machine is initialized with this SYNC signal.

At step S506, the CPU 50 outputs data via the terminal SD of the connector 60 (see FIG. 5). This data includes information concerning the operations performed on each game machine as stored in the data register of the mother machine. As described later, this data is stored in the data register of each daughter machine.

At step S508, the CPU 50 outputs a LO signal via the terminal SO of the connector 60 (see FIG. 5). As described later, the LO signal is inputted to the terminal SI of the connector 60 of the first daughter machine.

At step S510, the CPU 50 determines whether a start bit (LO signal) has been inputted to the terminal SD of the connector 60 or not. If a start bit has been inputted, the CPU 50 determines that a first daughter machine is connected, and the control proceeds to step S516. If a start bit has not been inputted, the control proceeds to step S512.

At step S512, the CPU 50 determines whether a predetermined period has lapsed or not since the LO signal was outputted via the terminal SO. If the predetermined period has not lapsed, the control returns to step S510. If the predetermined period has lapsed, the CPU 50 determines that no signal is coming from a first daughter machine, and the control proceeds to step S514.

At step S514, the CPU 50 determines that daughter machine is connected to the mother machine, thereby determining the number of players to be one, and the control returns to the flowchart of FIG. 11 at step S406.

At step S516, the CPU 50 determines whether a start bit (LO signal) has been inputted to the terminal SD of the connector 60 or not. If a start bit has been inputted, the CPU 50 determines that a second daughter machine is connected, and the control proceeds to step S522. If a start bit has not been inputted, the control proceeds to step S518.

At step S518, the CPU 50 determines whether a predetermined period has lapsed or not since the start bit was received from the first daughter machine. If the predetermined period has not lapsed, the control returns to step S516. If the predetermined period has lapsed, the CPU 50 determines that no signal is coming from a second daughter machine, and the control proceeds to step S520.

At step S520, the CPU 50 determines that the only daughter machine connected to the mother machine is the first daughter machine, thereby determining the number of players to be two, and the control returns to the flowchart of FIG. 11 at step S406.

At step S522, the CPU 50 determines whether a start bit (LO signal) has been inputted to the terminal SD of the connector 60 or not. If a start bit has been inputted, the CPU 50 determines that a third daughter machine is connected, and the control proceeds to step S528. If a start bit has not been inputted, the control proceeds to step S524.

At step S524, the CPU 50 determines whether a predetermined period has lapsed or not since the start bit was received from the second daughter machine. If the predetermined period has not lapsed, the control returns to step S522. If the predetermined period has lapsed, the CPU 50 determines that no signal is coming from a third daughter machine, and the control proceeds to step S526.

At step S526, the CPU 50 determines that the daughter machines connected to the mother machine are the first daughter machine and the second daughter machine, thereby determining the number of players to be three, and the control returns to the flowchart of FIG. 11 at step S406.

At step S528, the CPU 50 determines that the daughter machines connected to the mother machine are the first daughter machine, the second daughter machine, and the third daughter machine, thereby determining the number of players to be four, and the control returns to the flowchart of FIG. 11 at step S406.

Figure 13:
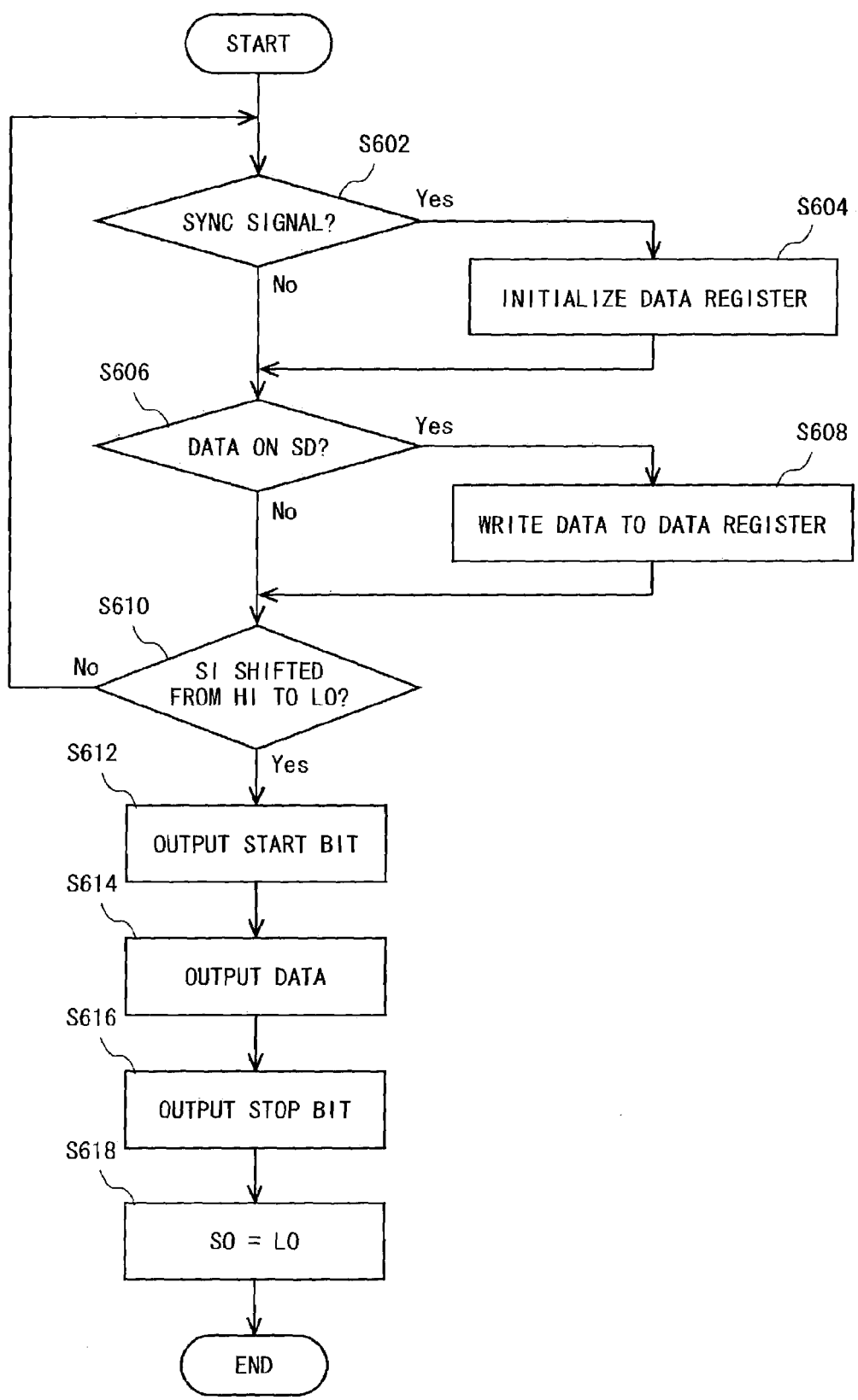
FIG. 13 is a flowchart illustrating the detailed procedure of step S404 in FIG. 11 on the daughter-side.

FIG. 13 is a flowchart illustrating the operation of a daughter machine, i.e., each of the game machines 10b to 10d. As described above, a given game machine 10 can be determined to be a daughter machine if the CPU 50 determines that the terminal SI is not always at the ground potential.

At step S602, the CPU 50 determines whether a SYNC signal is being inputted via the terminal SC of the connector 60 or not. If a SYNC signal is being inputted, the control proceeds to step S604 to initialize the data register, and the control proceeds to step S606. If a SYNC signal is not being inputted, the control proceeds to step S606.

At step S606, the CPU 50 determines whether data is being inputted via the terminal SD of the connector 60 or not. If data is being inputted, the control proceeds to step S608 to store the data to the data register, and the control proceeds to step S610. If not data is being inputted, the control proceeds to step S610. This data includes information concerning the operations performed on each game machine as stored in the data register of itself.

At step S610, the CPU 50 determines whether a LO signal has been inputted via the terminal SI of the connector 60 or not. If a LO signal has been inputted, the control proceeds to step S612. If a LO signal has not been inputted, the control returns to step S602.

At step S612, the CPU 50 outputs a start bit (LO signal) via the terminal SD of the connector 60.

At step S614, the CPU 50 outputs data via the terminal SD of the connector 60. This data includes information concerning the operations performed on each game machine as stored in the data register of the daughter machine.

At step S616, the CPU 50 outputs a stop bit (HI signal) via the terminal SD of the connector 60. At step S618, the CPU 50 outputs a LO signal via the terminal SO of the connector 60, and the control returns to a main routine similar to that for the mother machine.

Figure 14:
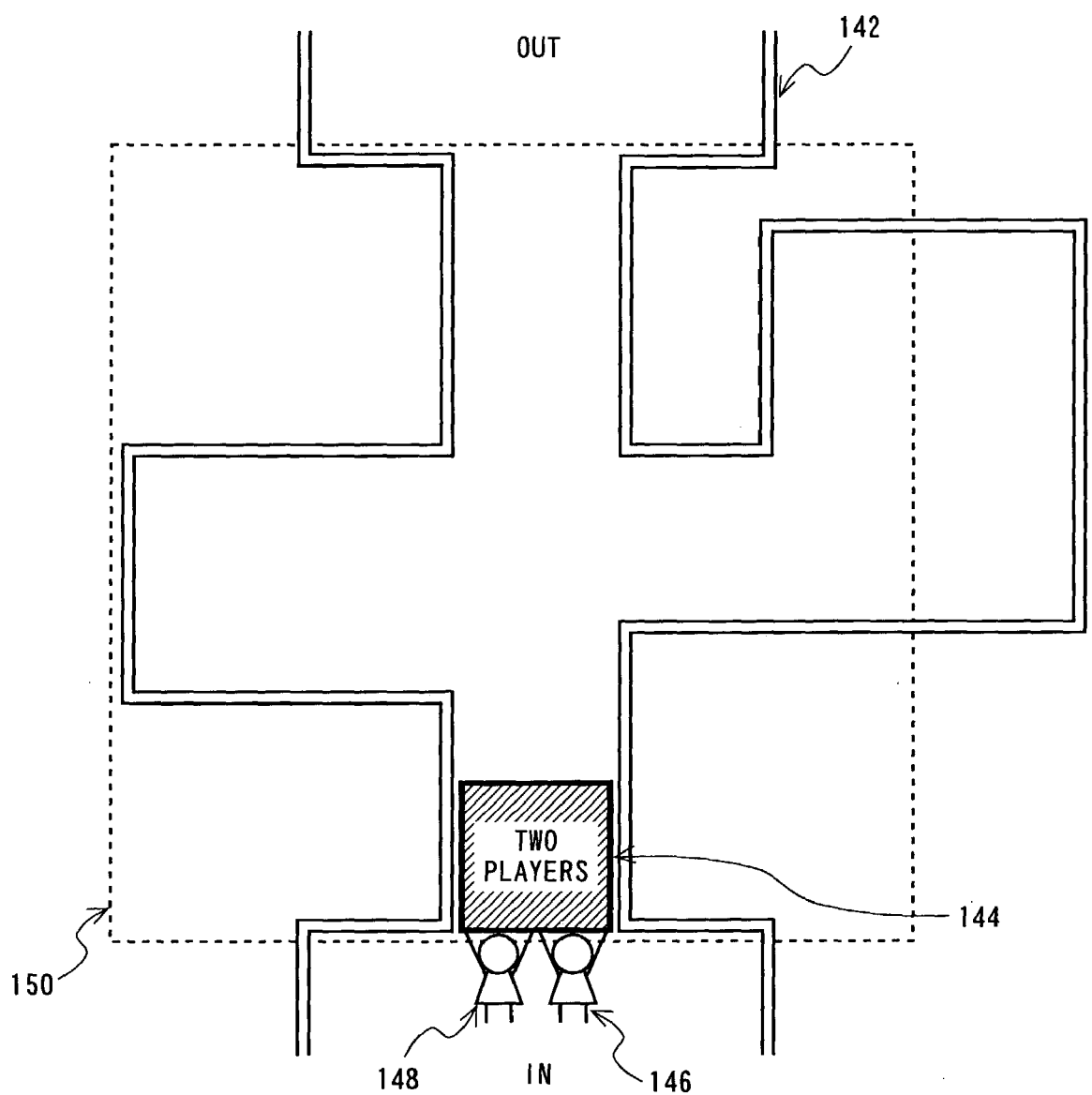
FIG. 14 is a diagram illustrating a two-player-mode game field for a first dungeon.

Next, referring to FIGS. 14 to 24, the game processing of step S424 will be described in detail. The present embodiment illustrates an action game of a type where player objects move through a plurality of game fields (game spaces) in the form of dungeons while attaining objectives (e.g., solving conundrums), until finally defeating a boss object, and get celebrated on a podium based on their order of excellence, reaching a grand ending. The game illustrated in the present embodiment is played by a plurality of players. Each player operates his/her game machine 10 to play the game while viewing an image shown on the LCD 14. On the LCD 14 of each game machine 10, background images and object images are displayed based on the BG data stored in the V-RAM and the OBJ data stored in the OAM 50aa. For example, in the case where two players are participating, two player objects appear on the game field as shown in FIG. 14, such that the LCD 14 of each game machine 10 displays the corresponding player object in the substantial center thereof. Therefore, another player object which is distantly located may not always be displayed on the LCD 14 of one's game machine 10.

Although the present embodiment illustrates two-dimensional game machines for example, other embodiments may alternatively be implemented on three-dimensional game machines. In such a case, everything may be expressed by polygons, without distinguishing BG from OBJ. Any other three-dimensional representation technique may also be employed.

The present embodiment illustrates a case where two game machines 10 are connected to execute a two-player-mode game, and a case where four game machines 10 are connected to execute a four-player-mode game. Three types of dungeons will be illustrated: a first dungeon, a second dungeon, and a third dungeon.

The first dungeon will be briefly described with reference to FIG. 14. FIG. 14 is a diagram illustrating a two-player-mode game field for a first dungeon, i.e., a game field in the case where two game machines 10 are connected to the game system. Walls 142, which represent walls of a cave from an entrance (IN) to an exit (OUT) of the cave, define a space in which the player objects 146 and 148 are capable of moving. An obstacle 144 (as an object image OBJ) is an object which can only be moved when pushed by all of the player objects (i.e., two in the illustrated example). When thus pushed, the obstacle 144 moves in the direction in which it is pushed. A player object 146 is a player object which is operated by means of the game machine 10a. A player object 148 is a player object which is operated by means of the game machine 10b. A panel 150 is a panel which varies depending on the number of participating players. The border of the panel is represented by a dotted line in FIG. 14 (note that the dotted line will not be displayed on the actual game screen). Portions of the map other than the panel 150 are represented by using common BG and OBJ.

Figure 15:
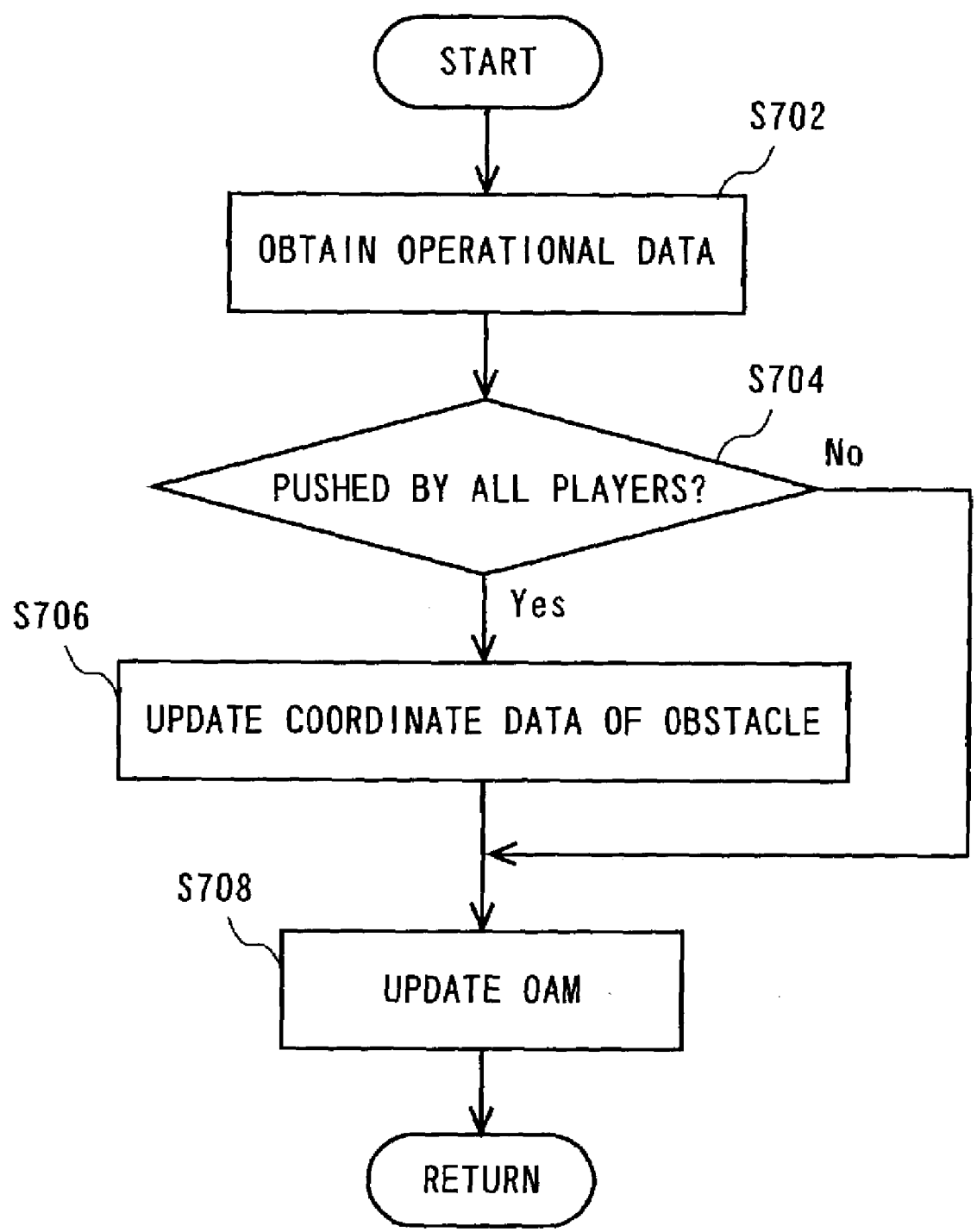
FIG. 15 is a flowchart illustrating the detailed procedure of step S424 in FIG. 11 at the first dungeon.
Figure 16:
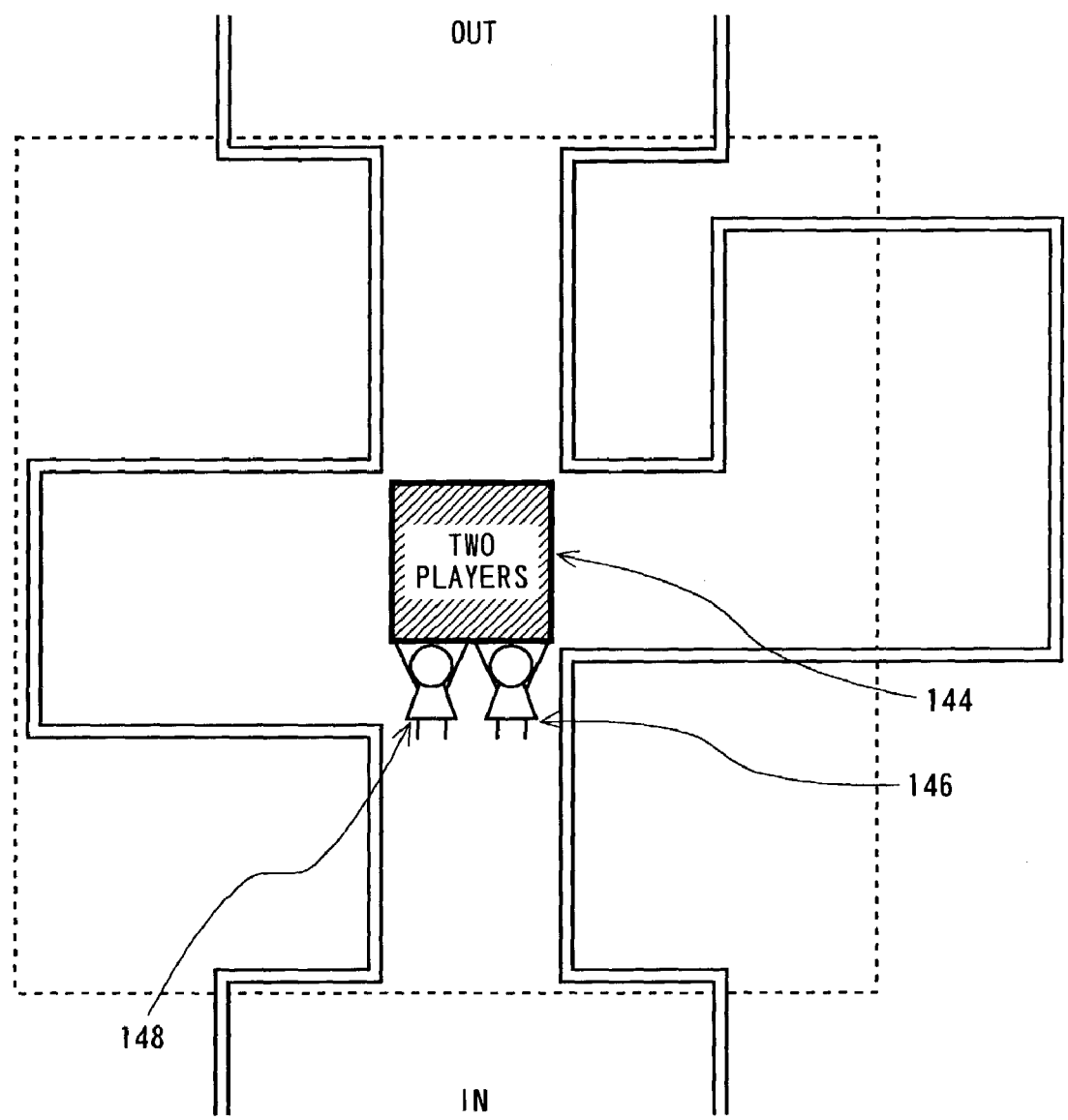
FIG. 16 is a diagram illustrating an obstacle and player characters having been moved on the two-player-mode game field of the first dungeon.

FIG. 15 is a flowchart illustrating the operation of the CPU 50 in the case where the player objects move through the first dungeon. At step S702, based on the operational data stored in the I/O register 50ad, the CPU 50 detects in which direction each player desires to move the player object. If the player is pressing the UP portion, DOWN portion, RIGHT portion, or LEFT portion of the cross button 16, the player can be determined to be desiring to move the player object in the upper direction, lower direction, right direction, or left direction, respectively.

At step S704, the CPU 50 determines whether (in the case of a two-player-mode game) both player objects 146 and 148 are pushing the obstacle 144 in the same direction as shown in FIG. 14 or not. If they are, the control proceeds to step S706. If not, the control proceeds to step S708.

At step S706, the CPU 50 updates the coordinate data of the obstacle 144 in the direction pushed by the player characters.

At step S708, the CPU 50 updates the coordinate data of the obstacle 144, the player objects 146 and 148 and any other object image OBJ stored in the OAM 50aa. By thus updating the data in the OAM 50aa, the displayed positions of the object images OBJ change. For example, if the obstacle 144 has been pushed by all of the player characters in the same direction, the obstacle 144 will appear to have moved in the pushed direction. After step S708 is finished, the control proceeds to step S426.

An instance of executing the above-illustrated game processing will be described. Once the game is begun, the players will operate their respective game machines 10 to cause their corresponding player objects to move over the LCD 14. Then, the players will bring their player objects into contact with the obstacle 144 so as to push the obstacle 144 forward. If all of the player objects are pushing the same obstacle 144 in the same direction, the obstacle 144 will move in the pushed direction. In this case, the obstacle 144 will move if both of the two player objects are pushing the obstacle 144 in the same direction. Thus, all of the player objects will eventually push the obstacle 144 to the position shown in FIG. 16, and then push the obstacle 144 from left to right so as to move the obstacle 144 to the right. As a result, the obstacle 144 is moved out of the way which connects the entrance IN to the exit OUT, thereby enabling the player objects to move to the exit OUT. When all of the player objects reach the exit OUT, the objective for this particular dungeon has been cleared.

Figure 17:
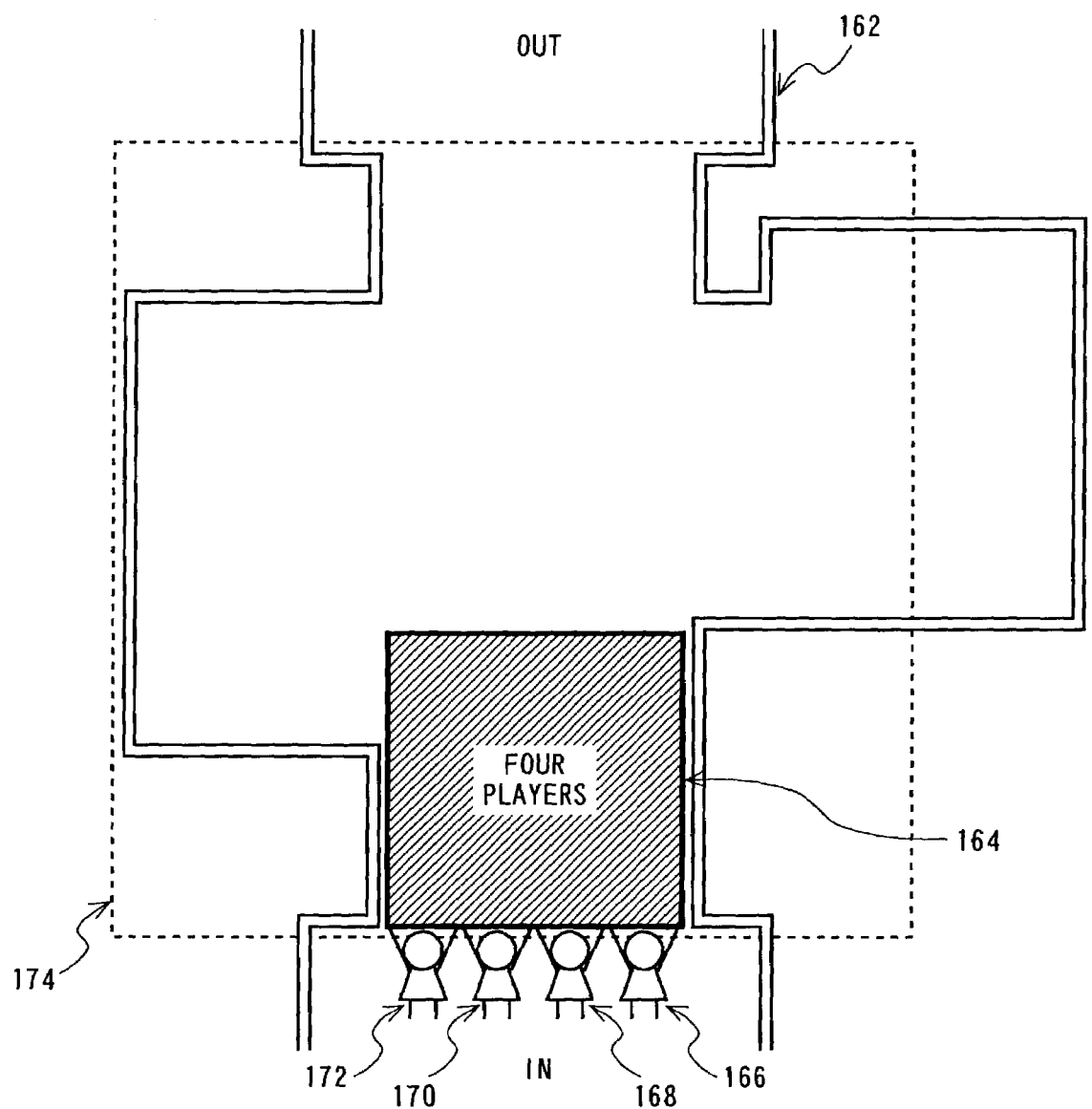
FIG. 17 is a diagram illustrating a four-player-mode game field for the first dungeon.
Figure 18:
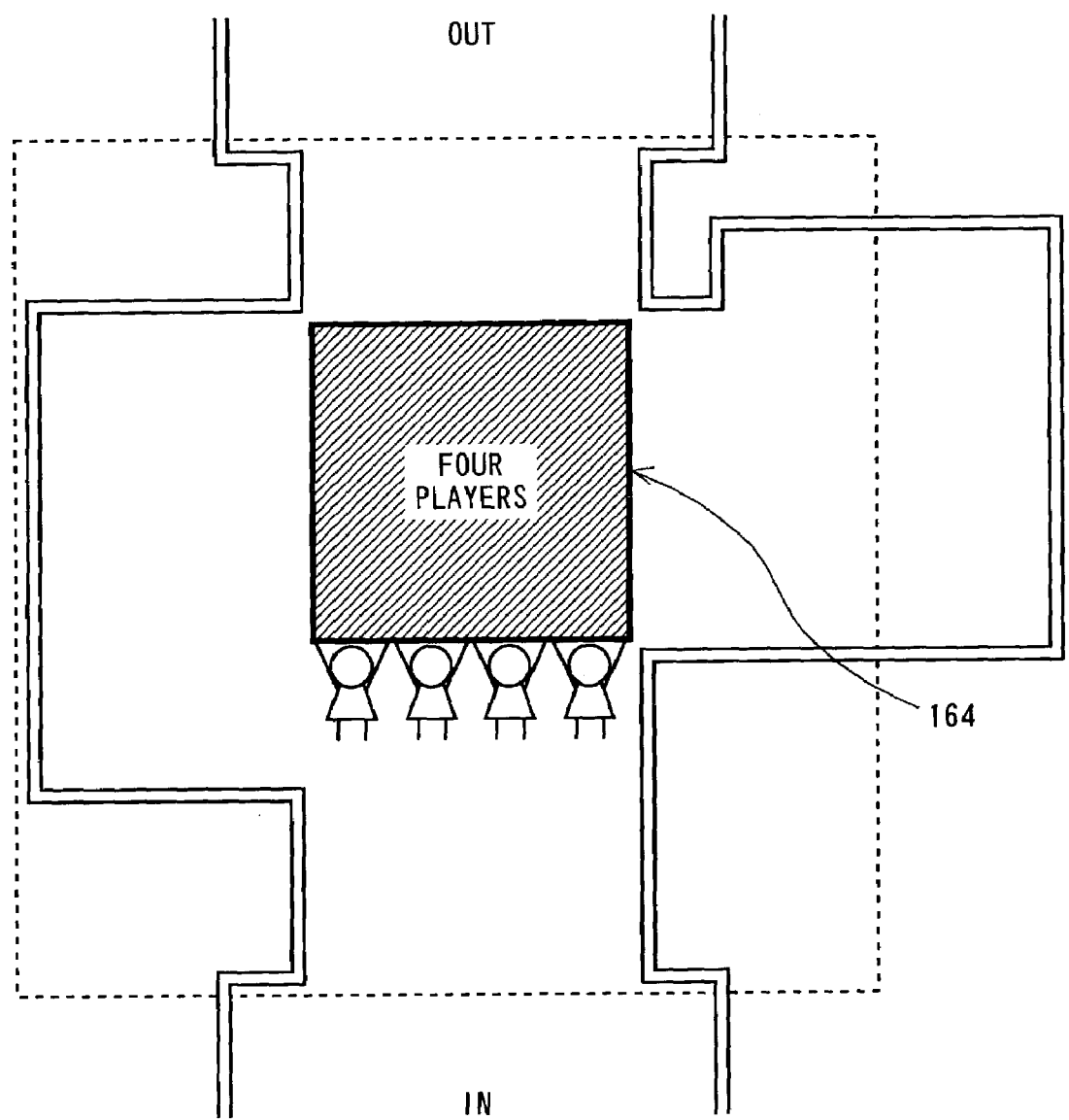
FIG. 18 is a diagram illustrating an obstacle and player characters having been moved on the four-player-mode game field of the first dungeon.

FIG. 17 is a diagram illustrating a four-player-mode game field for the same dungeon (first dungeon) as that shown in FIG. 14. The walls 162 are identical to the walls 142 shown in FIG. 14, e.g., with respect to the IN (entrance) and the OUT (exit), except for the portion enclosed by a panel 174. The obstacle 164 is larger than the obstacle 144, corresponding to the generally greater width between opposing parts of the walls 162. A player object 166 is a player object which is operated by means of the game machine 10a. A player object 168 is a player object which is operated by means of the game machine 10b. A player object 170 is a player object which is operated by means of the game machine 10c. A player object 172 is a player object which is operated by means of the game machine 10d. The panel 174, although identical in size to the panel 150 shown in FIG. 14, defines a different content from that of the panel 150. The portion of the game field other than that enclosed by the panel 174 is composed of the same common BG and OBJ as those used in FIG. 14. The game processing of the game illustrated in FIGS. 17 and 18 is similar to that of the game illustrated in FIGS. 14 and 16 in that the obstacle 164 is to be moved as shown in FIG. 18 for the dungeon to be cleared, except that it takes four player objects to push the obstacle or goal, as opposed to two player objects.

Figure 19:
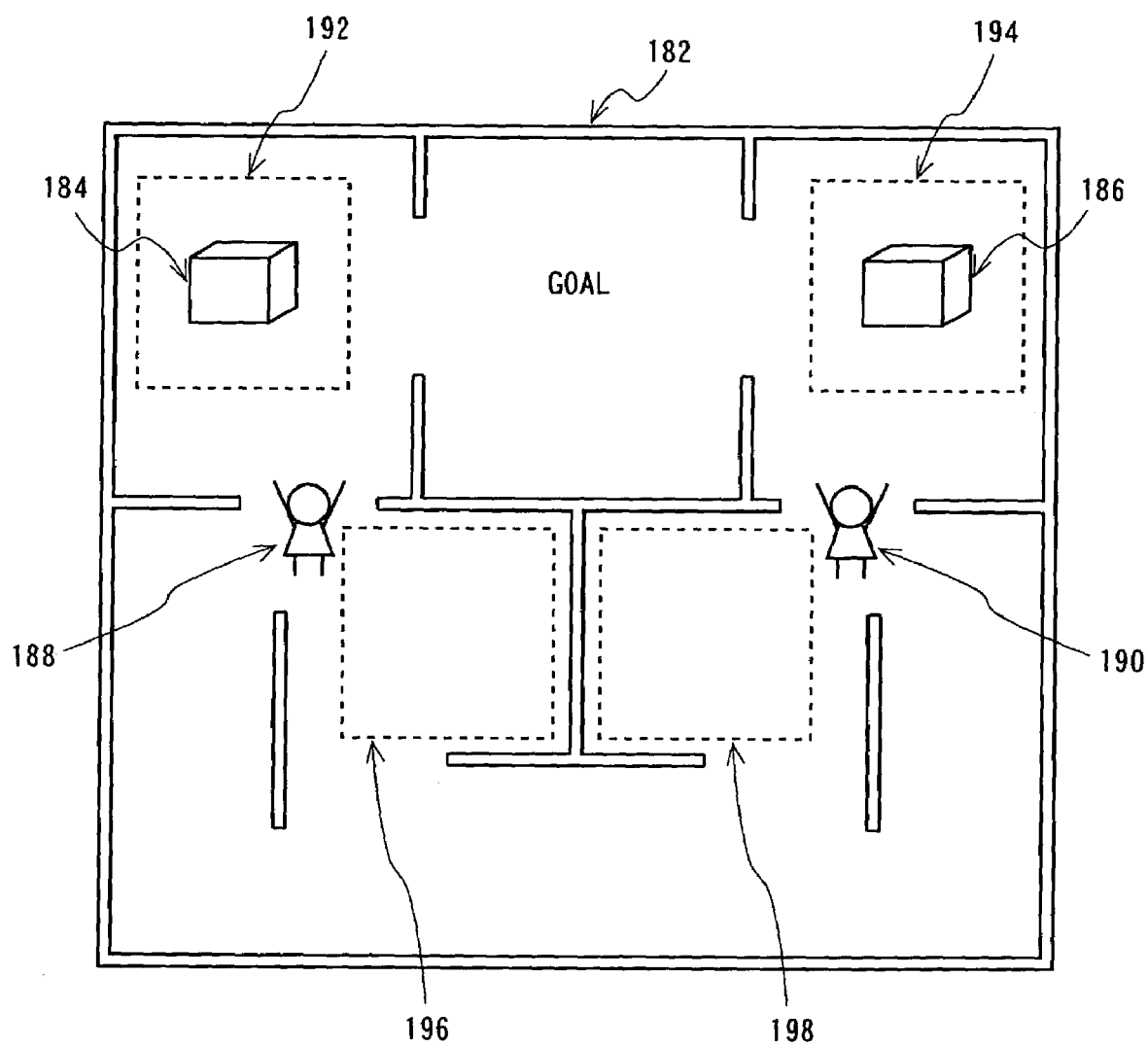
FIG. 19 is a diagram illustrating a two-player-mode game field for a second dungeon.

The second dungeon will be briefly described with reference to FIG. 19. FIG. 19 is a diagram illustrating a two-player-mode game field for a second dungeon, i.e., a game field in the case where two game machines 10 are connected to the game system. Walls 182, which represent walls of a cave, define a space in which the player objects 188 and 190 are capable of moving. Items 184 and 186 are types of object images OBJ. When the player object 188 or the player object 190 overlays itself upon the item 184 or 186, the item 184 or 186 becomes possession of the overlying player object. The items 184 and 186 are associated with, for example, specific functions such as destroying walls, digging holes, or attacking enemies. For example, a player object which possesses an item associated with the function of destroying walls can, by performing a predetermined operation, destroy a wall which lies in front of the player object. Panels 192, 194, 196, and 198 are panels which vary depending on the number of participating players. The border of each panel is represented by a dotted line in FIG. 19 (note that the dotted line will not be displayed on the actual game screen). In the case of the second dungeon, the panel data comprises BG data representing the ground of the dungeon and OBJ data representing items. Portions of the game field other than the panels 192, 194, 196, and 198 are represented by using common BG and OBJ.

Figure 20:
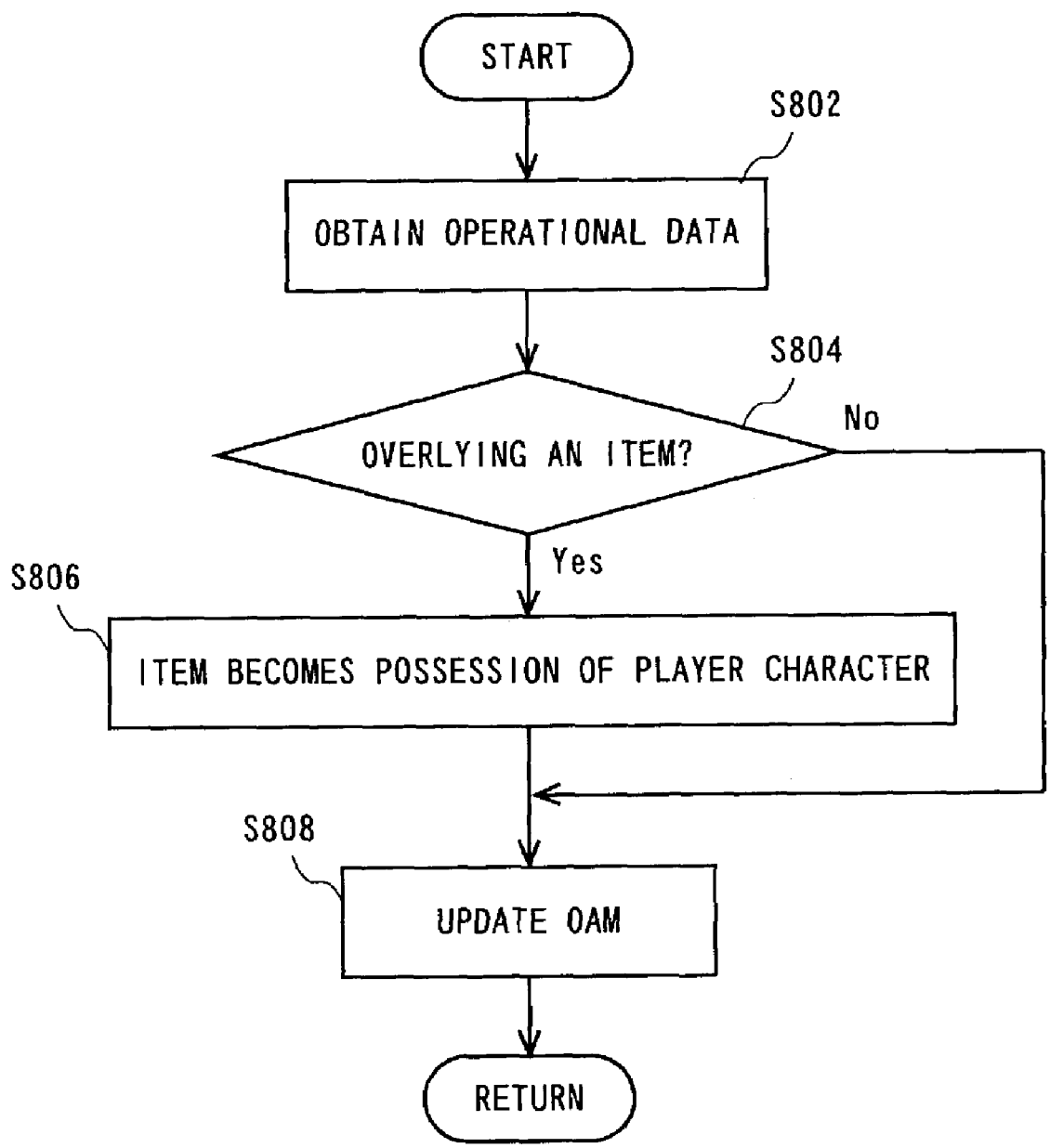
FIG. 20 is a flowchart illustrating the detailed procedure of a portion of step S424 in FIG. 11 at the second dungeon.

FIG. 20 is a flowchart illustrating the operation procedure of a portion of step S424 in FIG. 11 when the player objects move through the second dungeon. At step S802, based on the operational data stored in the I/O register 50ad, the CPU 50 detects how each player desires to move the player object.

At step S804, in the case of a two-player-mode game, the CPU 50 determines which of the player objects 188 and 190 (shown in FIG. 19), or both of them, has overlaid itself upon the item 184 or 186. If any overlap is detected, the control proceeds to step S806. If no overlap is detected, the control proceeds to step S808.

At step S806, the CPU 50 causes the item data concerning the overlaid item to be stored in a storage area corresponding to an overlying player object, which is provided in a data storage area within the intra-CPU work RAM 50ae (which in itself is provided for storing possessed items of each player object). As a result of this storage, the player object now "possesses" the item.

At step S808, the CPU 50 updates the coordinate data of the items 184 and 186, the player objects 188 and 190, and other object images OBJ stored in the OAM 50aa. During this update, the item(s) which is now possessed by the player object(s) is deleted from the item data in the OAM 50aa so that the possessed item(s) will not be displayed. After step S808 is finished, the control proceeds to step S426.

An instance of executing the above-illustrated game processing will now be described. Once the game is begun, the players will operate their respective game machines 10 to cause their corresponding player objects to move over the LCD 14. Then, the players will move their player objects so as to overlie the item 184 or 186, so that the overlaid items become possession of the player objects. The player objects will play the game while activating the possessed item and making their ways to the goal. If all of the player objects have reached the goal, the objective of the dungeon has been cleared.

FIG. 21 is a diagram illustrating a four-player-mode game field for the same dungeon (second dungeon) as that shown in FIG. 19. Walls 202 are similar to the walls 182 shown in FIG. 19. Four items 204, 206, 208, and 210 are displayed, corresponding to the number of game machines 10 connected to the system (as compared to the two items displayed in the case of FIG. 19). The functions of the items 204, 206, 208, and 210 may be the same as or different from those of items 184 and 186. A player object 212 is a player object which is operated by means of the game machine 10a. A player object 214 is a player object which is operated by means of the game machine 10b. A player object 216 is a player object which is operated by means of the game machine 10c. A player object 218 is a player object which is operated by means of the game machine 10d. Panels 220, 222, 224, and 226 are panels which vary depending on the number of participating players. The border of each panel is represented by a dotted line in FIG. 21 (note that the dotted line will not be displayed on the actual game screen). The panels 220, 222, 224, and 226, although identical in size and position to the panels 192, 194, 196, and 198 shown in FIG. 19, respectively, may define different item data from those of their counterparts. For example, the panels 224 and 226 contain items, whereas the panels 196 and 198 do not. Portions of the game field other than the panels 220, 222, 224, and 226 are represented by using common BG and OBJ. The condition for clearing this dungeon is the goal being reached by all of the four player objects.

Figure 22:
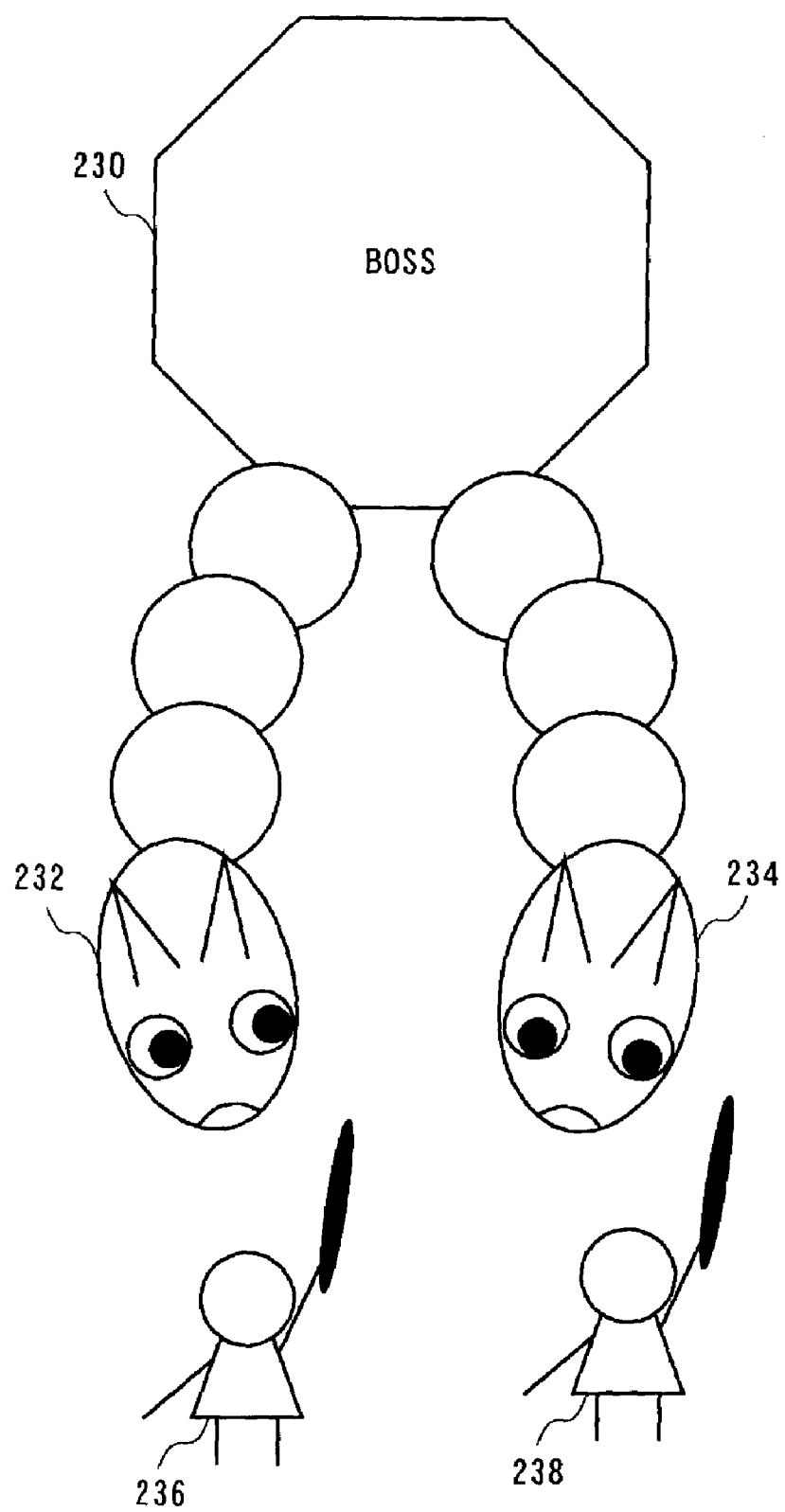
FIG. 22 is a diagram illustrating a boss object on a two-player-mode game field for a third dungeon.

The third dungeon will be briefly described with reference to FIG. 22. FIG. 22 is a diagram illustrating a boss object on a two-player-mode game field for a third dungeon, i.e., a game field in the case where two game machines 10 are connected to the game system. The boss object 230 is a character which appears in the dungeon at a final or fairly advanced stage of the game (note that the boss object 230 will appear when boss object data is stored in the OAM 50*aa*). The boss object 230 has heads 232 and 234, each of which attacks the player objects while moving about. Each of the heads 232 and 234 has a collision determination point, at which it is determined whether the head has been effectively attacked by the player objects. The player objects 236 and 238 each hold a weapon with which to attack the boss object 230. Although not shown, the panel in this case comprises OBJ data for the boss object and BG data for the background.

Figure 23:
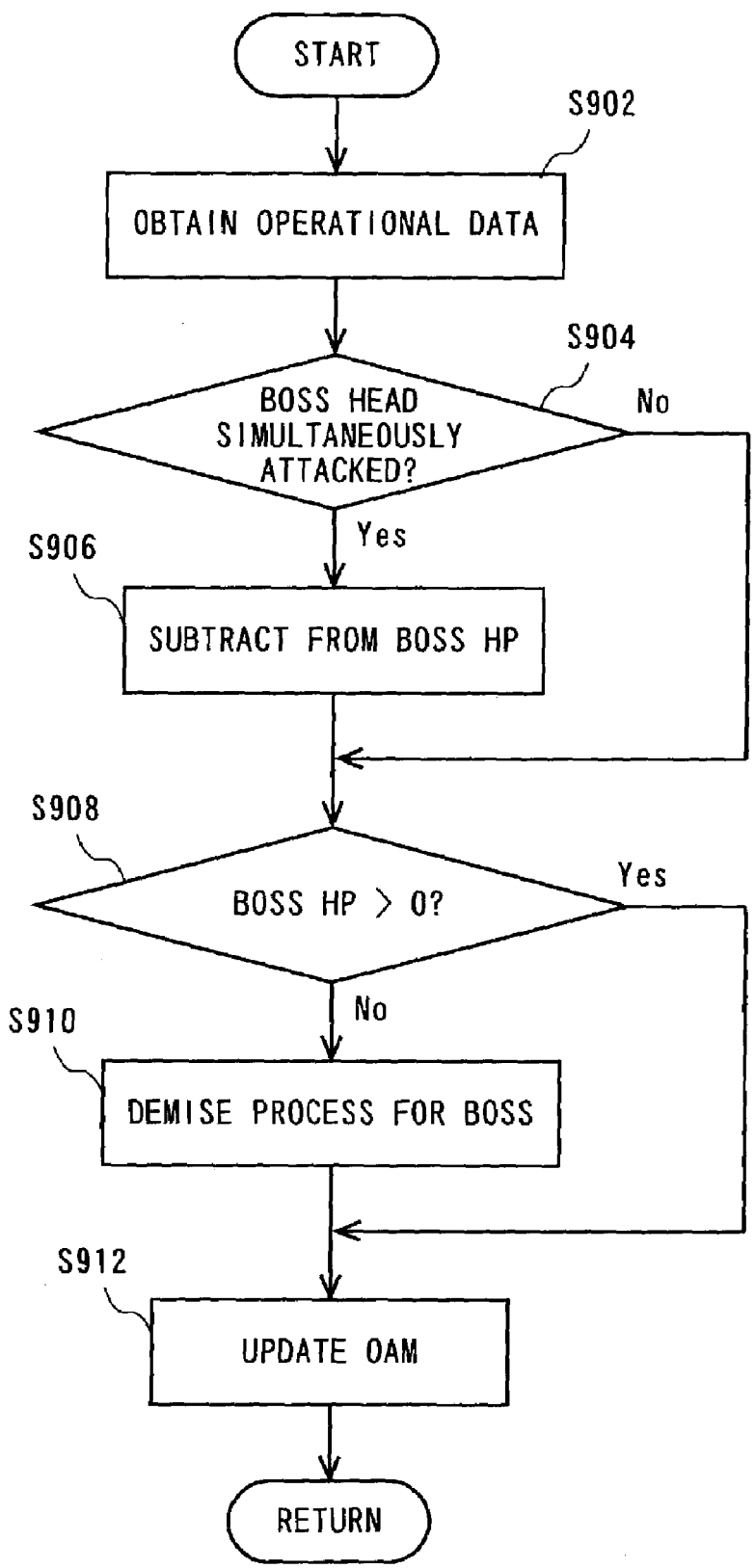
FIG. 23 is a flowchart illustrating the detailed procedure of a portion of step S424 in FIG. 11 at the third dungeon.

FIG. 23 is a flowchart illustrating the detailed procedure of a portion of step S424 in FIG. 11 when the player objects move through the third dungeon. At step S902, based on the operational data stored in the I/O register 50*ad*, the CPU 50 detects how each player desires to move the player object.

At step S904, in the case of a two-player-mode game, the CPU 50 determines whether or not the heads 232 and 234 have been simultaneously attacked by the respective player objects 236 and 238, or vice versa, as shown in FIG. 22. Specifically, the determination of such an attack can be made by checking the coordinates of the swords held by the player objects 236 and 238 and the coordinates of the heads 232 and 234 (i.e., the coordinates of the collision determination point) to see whether both heads are simultaneously overlaid by the respective swords or not. If such an attack has been detected, the control proceeds to step S904. If such an attack has not been detected, the control proceeds to step S906.

The boss object has hit points (as indicated by hit point data stored in a hit point storage area within the intra-CPU work RAM 50*ae*). The hit points of the boss object decrease as the player objects 236 and 238 simultaneously attack the respective heads 232 and 234, or vice versa.

At step S906, the CPU 50 reduces the hit points stored in the hit point storage area.

At step S908, the CPU 50 determines whether the hit points stored in the hit point storage area are greater than zero or not. If not, the control proceeds to step S910. If the hit points stored in the hit point storage area are greater than zero, the control proceeds to step S912.

At step S910, the CPU 50 performs a demise process of the boss object. Specifically, the CPU 50 performs processes for outputting animated images of the collapsing boss object 230 together with BGM.

At step S912, the CPU 50 updates the coordinate data of the boss object 230 (the heads 232 and 234), the player objects 236 and 238, and other object images OBJ stored in the OAM 50*aa*. After step S912 is finished, the control proceeds to step S426.

An instance of executing the above-illustrated game processing will now be described. The third dungeon is a dungeon where a boss object which appears at the final or fairly advanced stage of the game is to be conquered. Therefore, the manner in which to conquer the boss object 230 will be described. The boss object 230 has hit points, which decrease as the player objects 236 and 238 simultaneously attack the respective heads 232 and 234, or vice versa. When the player objects 236 and 238 have attacked the respective heads 232 and 234 a predetermined number of times, the hit points become zero. When the hit points have become zero, the boss object 230 is conquered, and the game is cleared.

Figure 24:
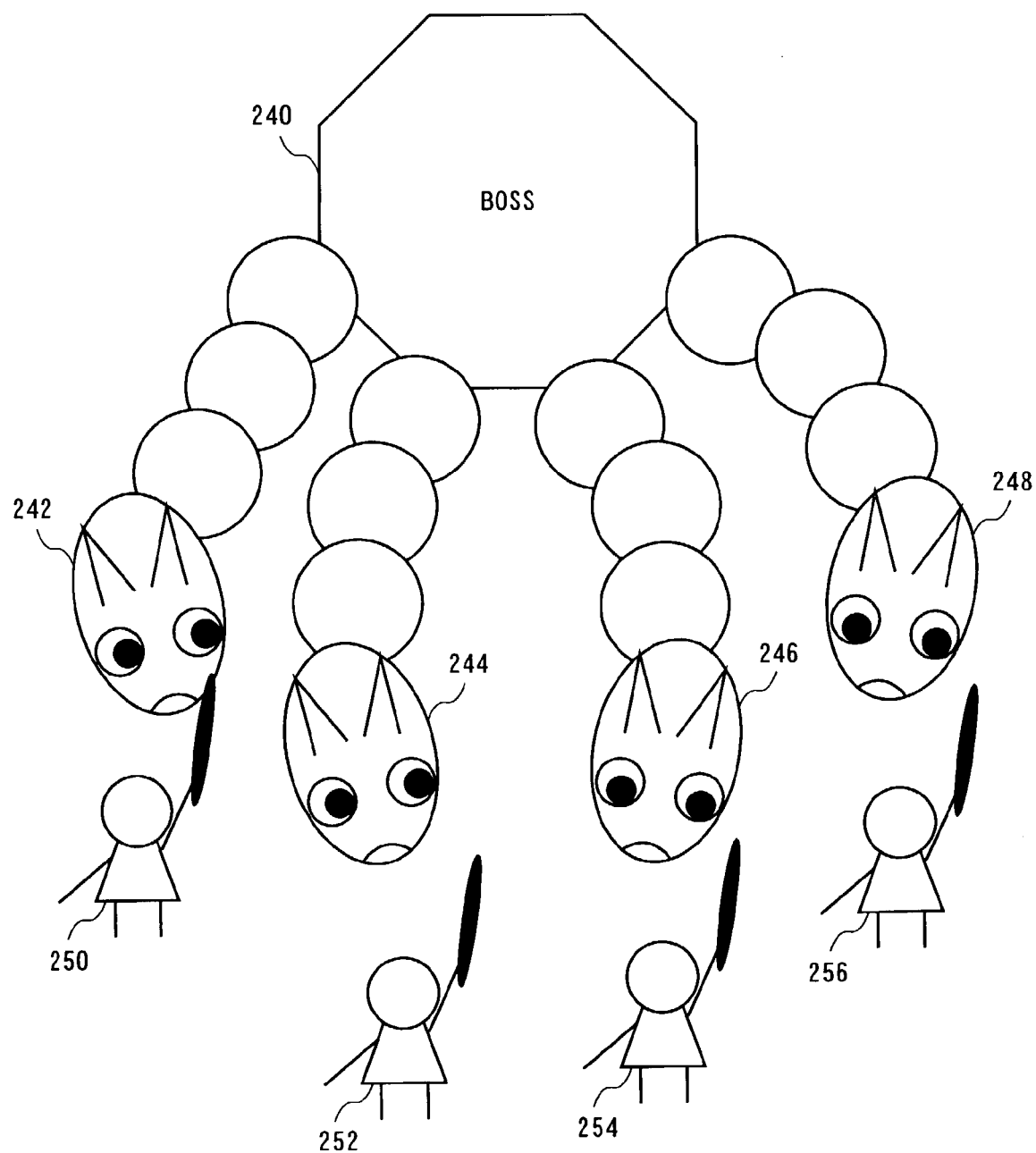
FIG. 24 is a diagram illustrating a boss object on a four-player-mode game field for the third dungeon.

FIG. 24 is a diagram illustrating a boss object 240 (corresponding to the boss object 230 shown in FIG. 22) on a four-player-mode game field for the third dungeon, i.e., a game field in the case where four game machines 10 are connected to the game system. The boss object 240 has four heads corresponding to the number of game machines 10 connected to the system. Each of the heads 242, 244, 246, and 248 has a collision determination point, at which it is determined whether the head has been effectively attacked by the player objects. The player objects 250, 252, 254, and 256 each hold a weapon with which to attack the boss object 240. When the boss object 240 has had its four heads 242, 244, 246, and 248 simultaneously attacked by the player objects 250, 252, 254 and 256 a predetermined number of times, loses its hit points (hit points=0), and collapses. The boss object 240 has substantially the same behavior as that of the boss object 230 except for having two more heads.

The above description describes one embodiment. It will be appreciated that there is no limitation as to the number of players so long as a plurality of players are involved. The game machine may be of any type, e.g., hand-held, stationary, color, monochrome, two-dimensional display, or three-dimensional display. The game program according to the present embodiment may be provided by a method which utilizes a recording medium such as an optical storage medium or a magnetic storage medium, or may be provided via a network such as The Internet.

While the invention has been described in detail, the foregoing description is in all aspects illustrative and not restrictive. It is understood that numerous other modifications and variations can be devised without departing from the scope of the invention.

What is claimed is:

1. A multi-player game system for allowing a plurality of players to play a game, comprising:

a number-of-players detector which detects the number of players participating in the game;

a primary game field data storage memory which stores primary game field data concerning a predetermined primary game field which does not vary depending on the number of participating players;

a secondary game field data storage memory which stores at least two units of secondary game field data concerning a secondary game field which varies depending on the number of participating players, wherein each unit of secondary game field data is associated with a different number of participating players;

a secondary game field data selector which selects, in accordance with the number of participating players as detected by the number-of-players detector, one of the at least two units of secondary game field data from the secondary game field data storage memory;

a game field generator which combines the primary game field data which has been read from the primary game field data storage memory with the secondary game field data which has been selected by the secondary game field data selector to generate a game field; and a game progression mechanism which allows the plurality of players to play the game on the game field generated by the game field generator;

wherein each unit of secondary game field data contains obstacle data representing an obstacle on the game field;

the game field generator generates the game field so as to include a different obstacle depending on the number of participating players;

the obstacle has a different size depending on the number of participating players;

the system further comprises a collision determination mechanism for detecting the number of player objects which are pushing the obstacle; and if the collision determination mechanism has determined that the player objects corresponding to a predetermined number of players are pushing the obstacle, the game field generator generates the game field such that the obstacle appears to have moved.

2. The multi-player game system according to claim 1, wherein, each unit of secondary game field data also contains geography data representing a geography of the game field, and the game field generator generates the game field so as to have a different geography depending on the number of participating players.

3. The multi-player game system according to claim 1, wherein the secondary game field data also contains item data representing an item which affects the progress of the game, and the game field generator generates the game field so as to include a different item depending on the number of participating players.

4. The multi-player game system according to claim 3, wherein the generated game field includes a different number of items depending on the number of participating players.

5. The multi-player game system according to claim 1, wherein the generated game field includes a plurality of secondary game fields, such that each of the plurality of secondary game fields is defined as a predetermined region on the generated game field from predetermined coordinates.

6. The multi-player game system according to claim 1, wherein the multi-player game system comprises a plurality of game machines, wherein each player operates a corresponding one of the plurality of game machines, each game machine includes a display, the display displaying a portion of the game field near the player object operated by each player.

7. The multi-player game system according to claim 1, wherein the secondary game field includes a region of the primary game field, the game field generator applies the secondary game field data which is selected by the secondary game field data selector to a portion of the primary game field data which is read from the primary game field data storage memory.

8. A multi-player program stored in at least one game machine readable medium to be executed by a plurality of game machines on which a plurality of players are allowed to play a game, each of the plurality of game machines comprising: primary game field data storage memory which stores primary game field data concerning a predetermined primary game field which does not vary depending on the number of participating players; secondary game field data storage memory which stores at least two units of secondary game field data concerning a secondary game field which varies depending on the number of participating players, wherein each unit of secondary game field data is associated with a different number of participating players, wherein the multi-player game program comprises:

a number-of-players detection program for detecting the number of players participating in the game;

a secondary game field data selection program for selecting, in accordance with the number of participating players as detected by the number-of-players detection program, one of the at least two units of secondary game field data from the secondary game field data storage memory;

a game field generation program for combining the primary game field data which has been read from the primary game field data storage memory with the secondary game field data which has been selected by the secondary game field data selection program to generate a game field; and a game progression program for allowing the plurality of players to play the game on the game field generated by the game field generation program;

wherein each unit of secondary game field data contains obstacle data representing an obstacle on the game field;

the game field generation program generates the game field so as to include a different obstacle depending on the number of participating players;

the obstacle has a different size depending on the number of participating players;

the game program further comprises a collision determination program for detecting the number of player objects which are pushing the obstacle, and if the collision determination program has determined that the player objects corresponding to a predetermined number of players are pushing the obstacle, the game field generation program generates the game field such that the obstacle appears to have moved.

9. The multi-player game program according to claim 8, wherein, each unit of secondary game field data also contains geography data representing a geography of the game field, and the game field generation program generates the game field so as to have a different geography depending on the number of participating players.

10. The multi-player game program according to claim 8, wherein the secondary game field data also contains item data representing an item which affects the progress of the game, and the game field generation program generates the game field so as to include a different item depending on the number of participating players.

11. The multi-player game program according to claim 10, wherein the generated game field includes a different number of items depending on the number of participating players.

12. The multi-player game program according to claim 8, wherein the generated game field includes a plurality of secondary game fields, such that each of the plurality of secondary game fields is defined as a predetermined region on the generated game field from predetermined coordinates.

13. The multi-player game program according to claim 8, wherein the number-of-players detection program, the secondary game field data selection program, and the game field generation program are simultaneously executed on the plurality of game machines.

14. The multi-player game program according to claim 8, wherein the secondary game field includes a region of the primary game field, the game field generation program applies the secondary game field data which is selected by the secondary game field data selection program to a portion of the primary game field data which is read from the primary game field data storage memory.

* * * * *